(12) United States Patent
Kim et al.

(10) Patent No.: US 11,544,184 B2
(45) Date of Patent: Jan. 3, 2023

(54) STORAGE DEVICE AND METHOD OF OPERATING THE SAME FOR PROCESSING A TRIM REQUEST OF HOST

(71) Applicant: SK hynix Inc., Gyeonggi-do (KR)

(72) Inventors: Dong Wook Kim, Gyeonggi-do (KR); Dong Ham Yim, Gyeonggi-do (KR); Joon Ho Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 26 days.

(21) Appl. No.: 17/215,310

(22) Filed: Mar. 29, 2021

(65) Prior Publication Data
US 2022/0107887 A1    Apr. 7, 2022

(30) Foreign Application Priority Data
Oct. 7, 2020    (KR) .......................... 10-2020-0129578

(51) Int. Cl.
*G06F 12/02* (2006.01)
*G06F 12/0882* (2016.01)
*G06F 12/0891* (2016.01)

(52) U.S. Cl.
CPC ...... *G06F 12/0246* (2013.01); *G06F 12/0253* (2013.01); *G06F 12/0882* (2013.01); *G06F 12/0891* (2013.01); *G06F 2212/7201* (2013.01)

(58) Field of Classification Search
CPC ............. G06F 12/0246; G06F 12/0253; G06F 12/0882; G06F 12/0891; G06F 2212/7201; G06F 12/0292; G06F 12/1009; G06F 12/109; G06F 2212/1024
See application file for complete search history.

(56) References Cited

U.S. PATENT DOCUMENTS

| | | | |
|---|---|---|---|
| 10,061,708 B2 | 8/2018 | Huang et al. | |
| 2017/0329716 A1* | 11/2017 | Huang | ................ G06F 12/0246 |
| 2021/0165734 A1* | 6/2021 | Chung | ................ G06F 12/0882 |

FOREIGN PATENT DOCUMENTS

KR    10-1824949    2/2018

* cited by examiner

*Primary Examiner* — Tasnima Matin
(74) *Attorney, Agent, or Firm* — IP & T Group LLP

(57) ABSTRACT

The present technology relates to an electronic device. A storage device includes a memory device including pages, a buffer memory configured to store address mapping information including a mapping relationship between logical addresses provided from a host and physical addresses corresponding to the pages, first trim bitmap information including trim information of first logical address groups each including a first number of logical addresses having at least two of the logical addresses, and second trim bitmap information including trim information of second logical address groups each including a second number of logical addresses greater than the first number of the logical addresses, and a memory controller configured to change, based on a number of trim-requested logical addresses from the host, map states of the trim-requested logical addresses in one of the address mapping information, the first trim bitmap information, and the second trim bitmap information.

20 Claims, 19 Drawing Sheets

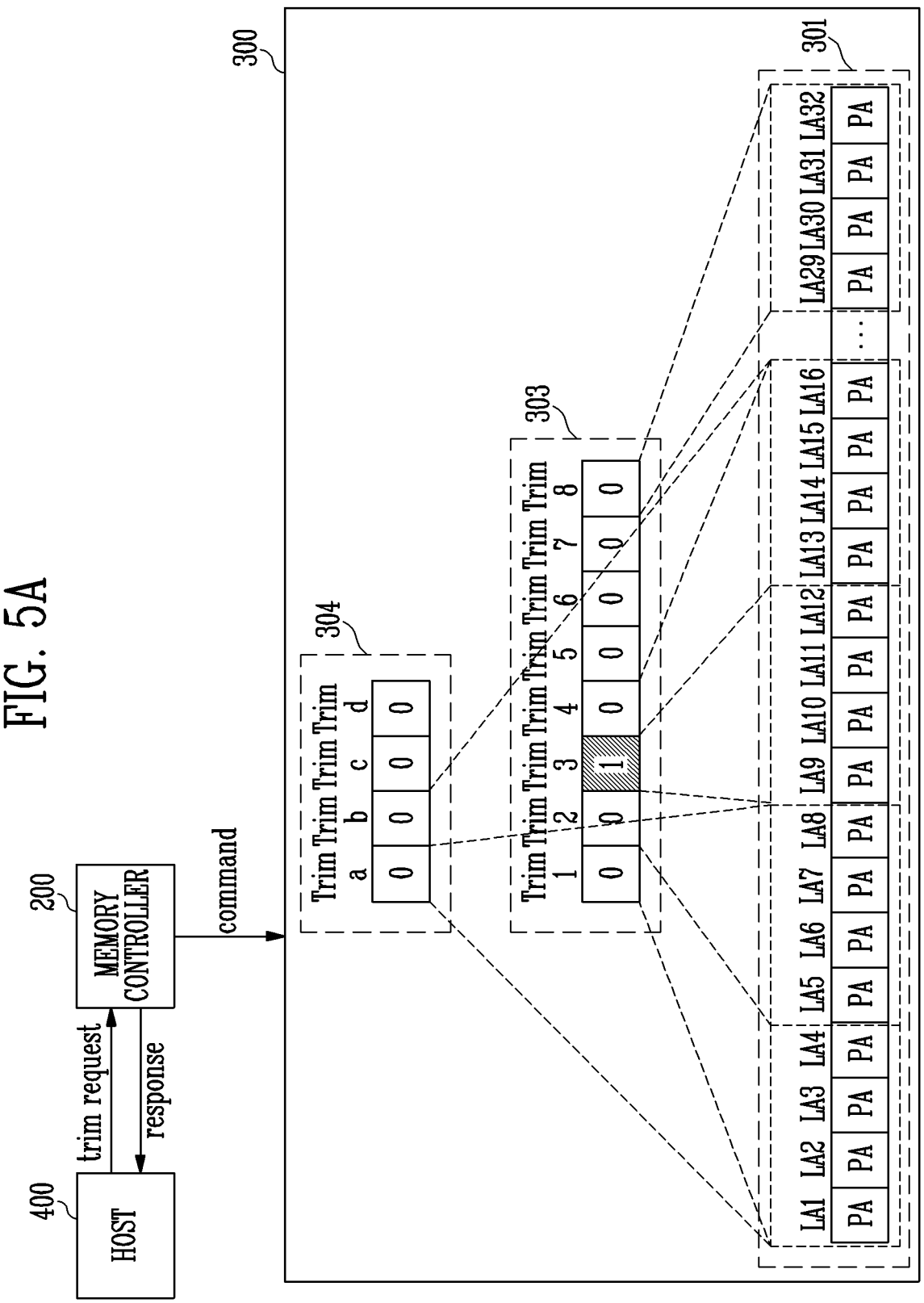

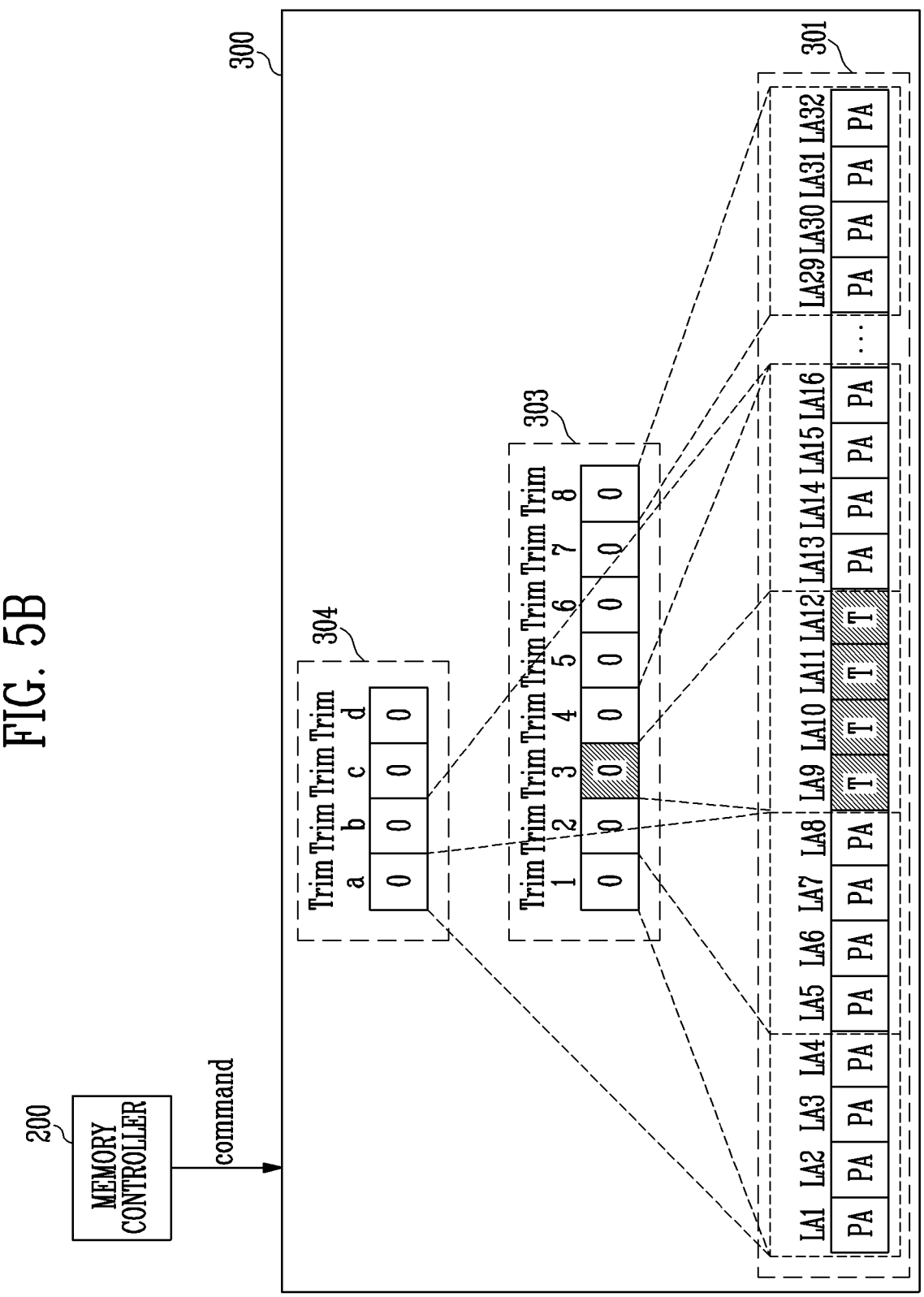

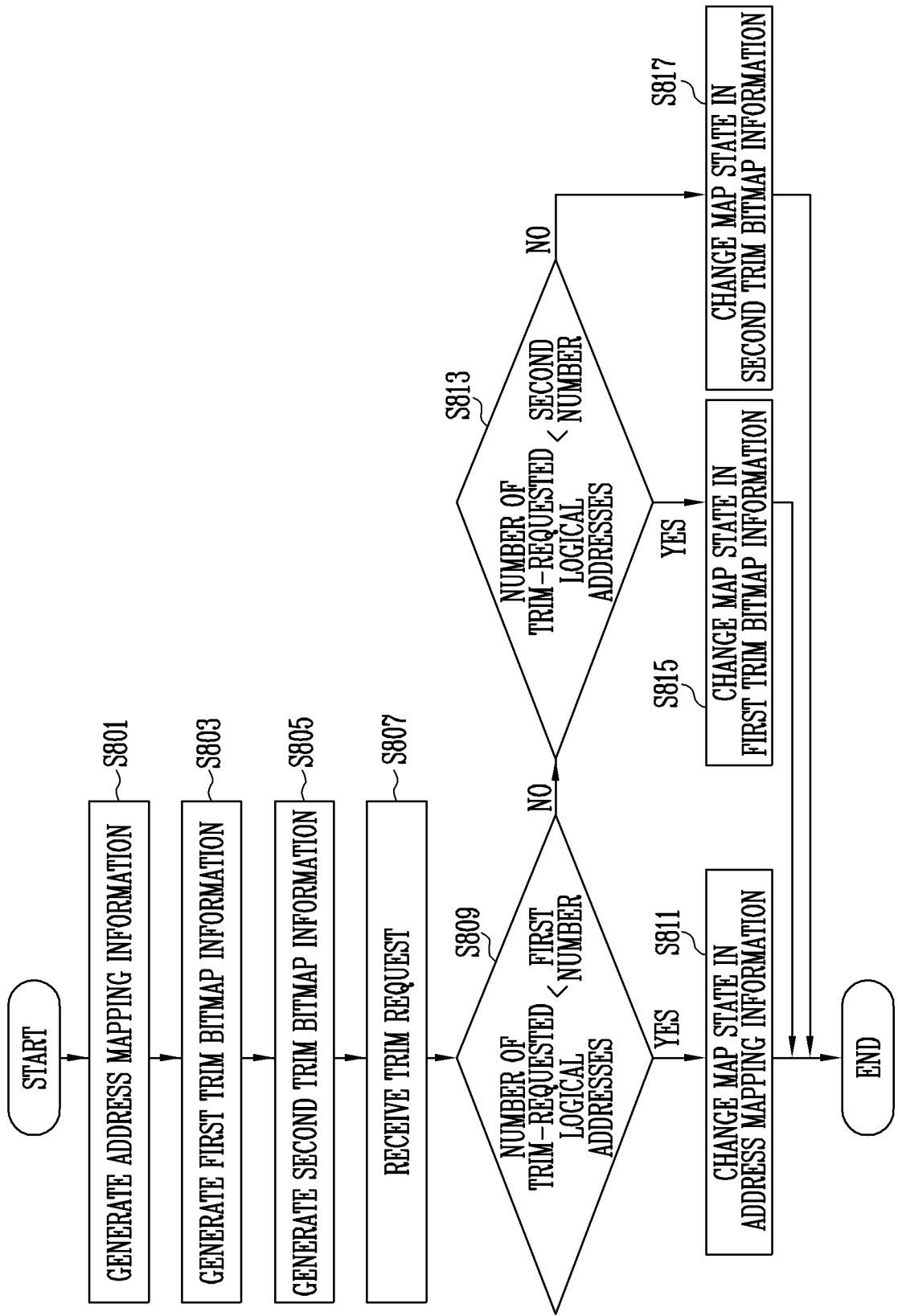

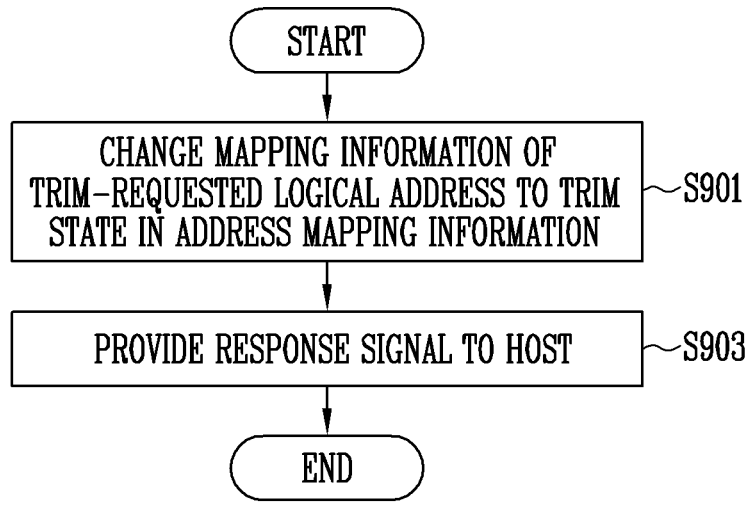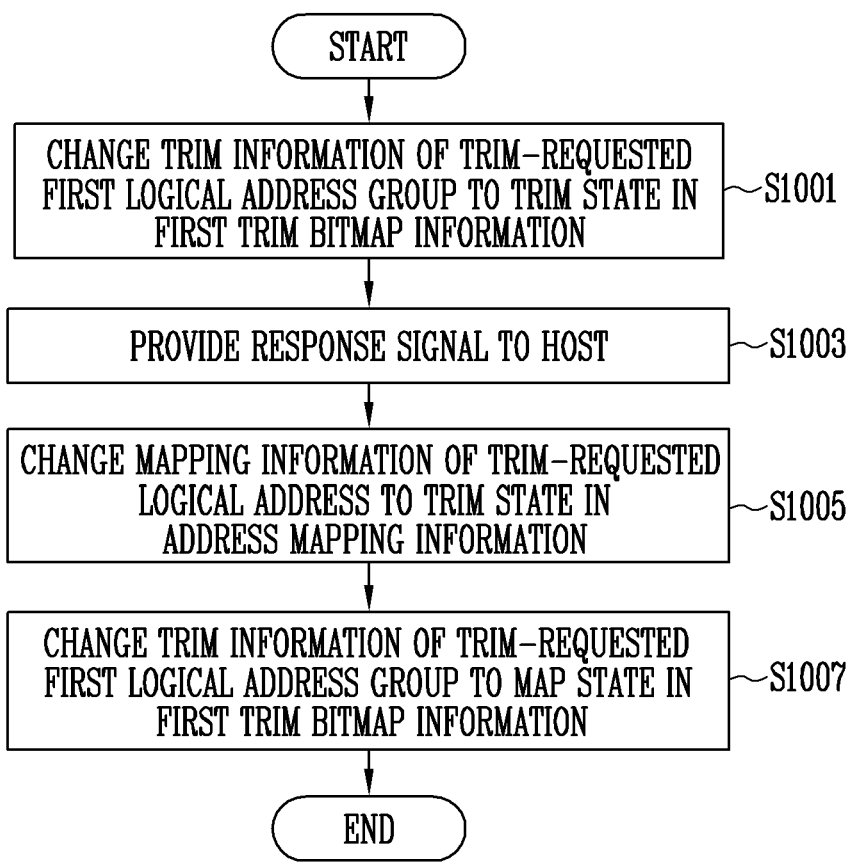

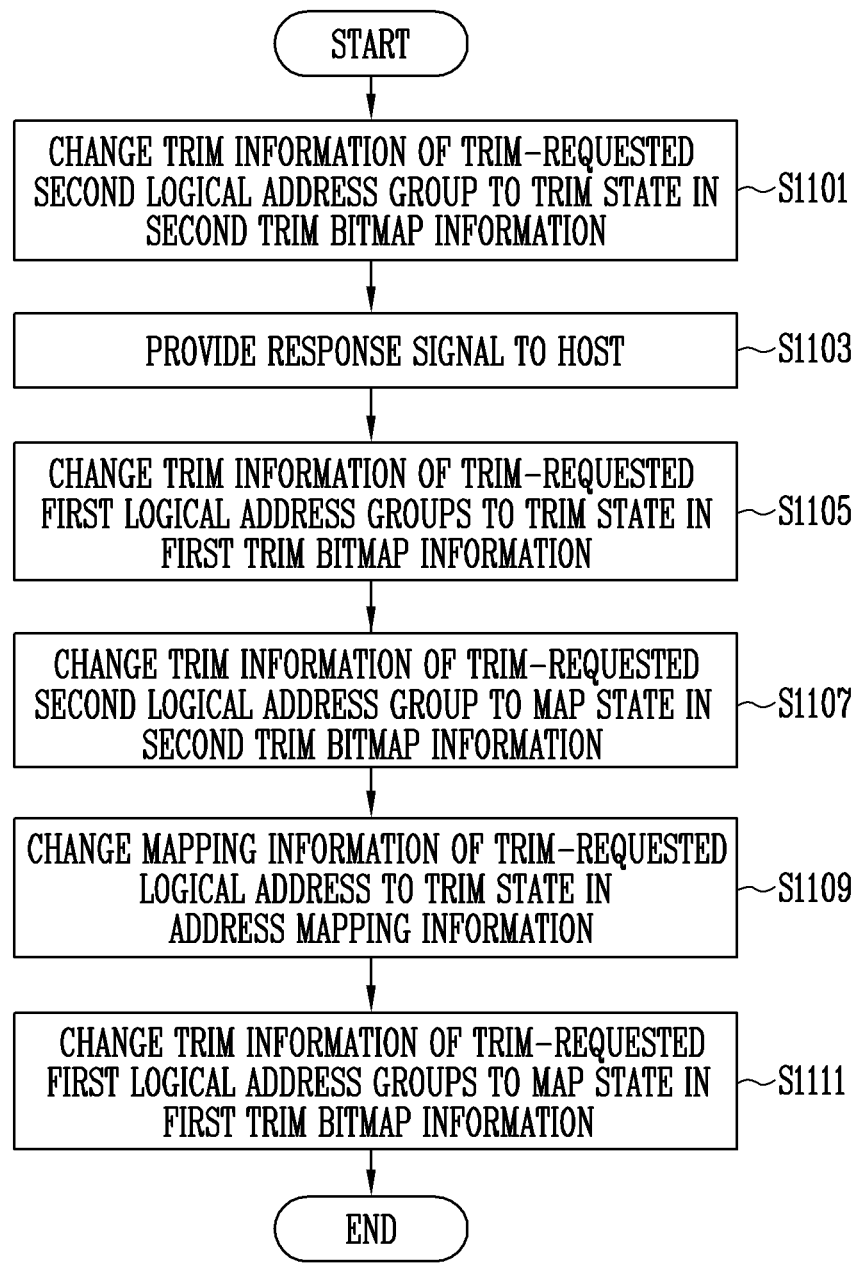

STORAGE DEVICE AND METHOD OF OPERATING THE SAME FOR PROCESSING A TRIM REQUEST OF HOST

CROSS-REFERENCE TO RELATED APPLICATION

The present application claims priority under 35 U.S.C. § 119(a) to Korean patent application number 10-2020-0129578, filed on Oct. 7, 2020, which is incorporated herein by reference in its entirety.

BACKGROUND

Field of Invention

The present disclosure relates to an electronic device, and more particularly, to a storage device and a method of operating the same.

Description of Related Art

A storage device is a device that stores data under control of a host device such as a computer or a smartphone. A storage device may include a memory device storing data and a memory controller controlling the memory device. The memory device may be classified into a volatile memory device and a nonvolatile memory device.

The volatile memory device may be a device that stores data only when power is supplied and loses the stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a storage device having an improved trim processing operation speed and a method of operating the same.

According to an embodiment of the present disclosure, a storage device includes a memory device including a plurality of pages, a buffer memory configured to store address mapping information including a mapping relationship between a plurality of logical addresses provided from a host and a plurality of physical addresses corresponding to the plurality of pages, first trim bitmap information including trim information of a plurality of first logical address groups each including a first number of logical addresses that are at least two logical addresses of the plurality of logical addresses, and second trim bitmap information including trim information of a plurality of second logical address groups each including a second number of logical addresses greater than the first number of the plurality of logical addresses, and a memory controller configured to change, based on a number of trim-requested logical addresses from the host, map states of the trim-requested logical addresses in one of the address mapping information, the first trim bitmap information, and the second trim bitmap information.

According to an embodiment of the present disclosure, a method of operating a storage device including a memory device including a plurality of pages, a buffer memory, and a memory controller that controls the memory device and the buffer memory includes generating address mapping information including a mapping relationship between a plurality of logical addresses provided from a host and a plurality of physical addresses corresponding to the plurality of pages, generating first trim bitmap information including trim information of a plurality of first logical address groups each including a first number of logical addresses that are at least two logical addresses of the plurality of logical addresses, generating second trim bitmap information including trim information of a plurality of second logical address groups each including a second number of logical addresses greater than the first number of the plurality of logical addresses, receiving a trim request from the host, changing trim information of a trim-requested second logical address group including trim-requested logical addresses from the host among the plurality of second logical address groups to a trim state in the second trim bitmap information, changing trim information of trim-requested first logical address groups each including some of the trim-requested logical addresses among the plurality of first logical address groups to the trim state in the first trim bitmap information, based on the changed trim information of the trim-requested second logical address group in the second trim bitmap information, and changing mapping information of the trim-requested logical addresses among the plurality of logical addresses in the address mapping information, based on the changed trim information of the trim-requested first logical address groups in the first trim bitmap information.

According to an embodiment of the present disclosure, a storage device includes a buffer memory configured to buffer entry values each representing a state of a logical address unmapped from or mapped to a physical address, first bit values each representing the states of a first number of ones among the logical addresses, and second bit values each representing the states of a second number of ones among the logical addresses, the second number being greater than the first number, and a controller configured to change one or more among the first bit values to reflect the change of the first bit values into the entry values in response to an unmap request for target logical addresses, a number of which is between the first and second numbers, and change one or more among the second bit values to reflect the change of the second bit values into the entry values in response to the unmap request for the target logical addresses, a number of which is greater than the second number.

The controller may output a response for the unmap request upon changing the first or second bit values.

The controller may change entry values corresponding the target logical addresses to an unmap state, based on the change of the first bit values or the change of the second bit values.

According to the present technology, a storage device having an improved trim processing operation speed and a method of operating the same are provided.

BRIEF DESCRIPTION OF THE DRAWINGS

FIGS. 5A and 5B are diagrams illustrating an example in which a map state is changed in address mapping information using first trim bitmap information according to an embodiment of the present disclosure.

FIG. 8 is a flowchart illustrating a method of operating a storage device according to an embodiment of the present disclosure.

FIG. 9 is a flowchart illustrating a method of changing a map state in address mapping information according to an embodiment of the present disclosure.

FIG. 10 is a flowchart illustrating a method of changing a map state in address mapping information using first trim bitmap information according to an embodiment of the present disclosure.

FIG. 11 is a flowchart illustrating a method of changing a map state in address mapping information using second trim bitmap information according to an embodiment of the present disclosure.

DETAILED DESCRIPTION

Specific structural or functional descriptions of embodiments which are disclosed in the present specification or application are illustrated only to describe the embodiments according to the present disclosure. The embodiments according to the present disclosure may be carried out in various forms and the descriptions are not limited to the embodiments described in the present specification or application.

Figure 1:
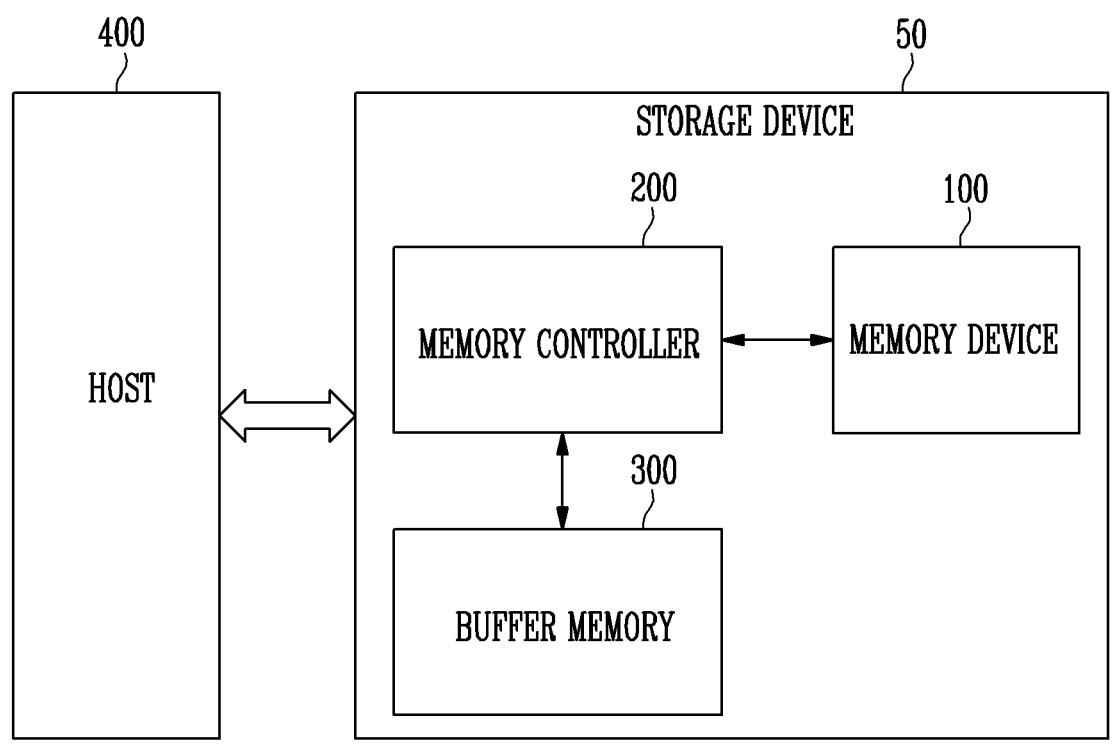
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device. The storage device 50 may be a device that stores data under control of a host 400 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 400. For example, the storage device 50 may be configured as any one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command CMD and an address ADDR from the memory controller 200 and access an area selected by the address in the memory cell array. The memory device 100 may perform an operation instructed by the command CMD on the area selected by the address ADDR. For example, the memory device 100 may perform a write operation (program operation), a read operation, and an erase operation. During the program operation, the memory device 100 may program data in the area selected by the address ADDR. During the read operation, the memory device 100 may read data from the area selected by the address ADDR. During the erase operation, the memory device 100 may erase data stored in the area selected by the address ADDR.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 400, and the memory controller 200 may include a flash translation layer (FTL) that controls communication between the host 400 and the memory device 100, and a flash interface layer (FIL) that controls communication with the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored. In the present specification, the LBA and a "logic address" or a "logical address" may be used as having the same meaning. In the present specification, the PBA and a "physical address" may be used as having the same meaning.

The memory controller 200 may control the memory device 100 to perform the program operation, the read operation, or the erase operation according to a request of the host 400. During the program operation, the memory controller 200 may provide a write command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently regardless of the request from the host 400 and transmit the command, the address, and the data to the memory device 100. For example, the memory controller 200 may provide the command, the address, and the data to the memory device 100, for performing a read operation and a program operation accompanying wear leveling, read reclaim, garbage collection, and the like.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The host 400 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

The memory controller 200 may control the buffer memory 300 to temporarily store data to be stored in the memory device 100 according to a request of the host 400. The data stored in the buffer memory 300 may be stored in a pre-allocated area (not shown) in the buffer memory 300 according to a logical address.

A program unit is defined as a size of data to be programmed into the memory device 100 at a time during a program operation. A size of data provided to the storage device 50 from the host 400 at a time may be different from the program unit. Therefore, the memory controller 200 may store data received according to the program request of the host 400 in the buffer memory 300. Thereafter, when data stored in the buffer memory 300 becomes a size of the program unit, the memory controller 200 may control the buffer memory 300 and the memory device 100 to program the data of the program unit into the memory device 100.

The buffer memory 300 may be a volatile memory device. Therefore, when power is cut off, the data stored in the buffer memory 300 may not be maintained.

Referring to FIG. 1, the buffer memory 300 is included in the storage device 50 and is positioned outside the memory controller 200. However, in various embodiments, the buffer memory 300 may be positioned inside the memory controller 200.

Figure 2:
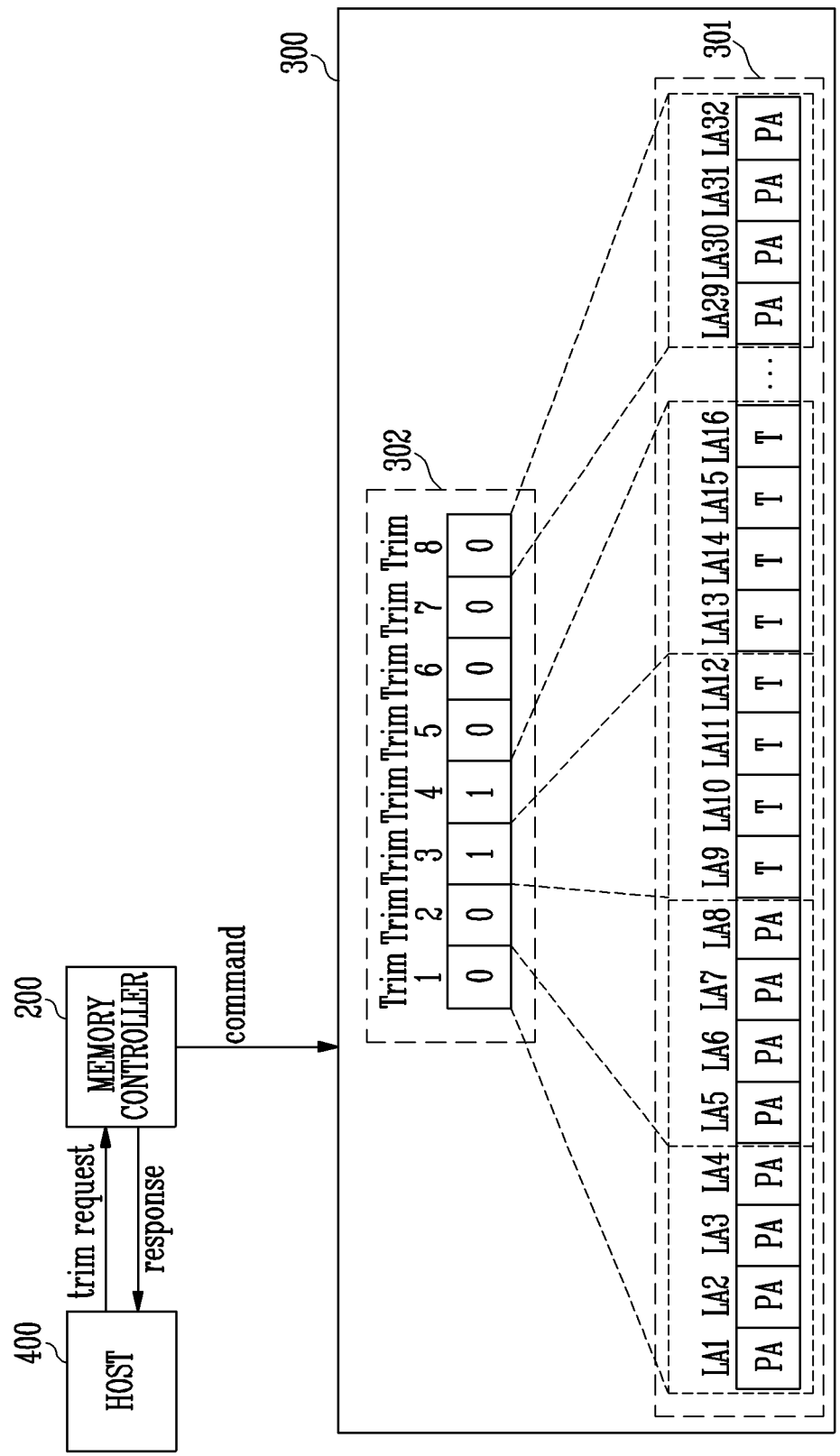
FIG. 2 is a diagram illustrating address mapping information and trim bitmap information according to an embodiment of the present disclosure.

FIG. 2 is a diagram illustrating address mapping information 301 and trim bitmap information 302 according to an embodiment of the present disclosure.

Referring to FIG. 2, the buffer memory 300 may store the address mapping information 301 and the trim bitmap information 302.

The address mapping information 301 may include a mapping relationship between a plurality of logical addresses provided from the host 400 and a plurality of physical addresses corresponding to a plurality of pages included in the memory device 100. In an embodiment, the address mapping information 301 may include a state of each of the plurality of logical addresses unmapped from or mapped to a physical address.

In an embodiment, the address mapping information 301 may be stored in the memory device 100. The memory controller 200 may read some of the address mapping information 301 and store the some of the address mapping information 301 in the buffer memory 300.

In FIG. 2, the address mapping information 301 includes a mapping relationship between first to thirty-second logical addresses LA1 to LA32 and physical addresses PA, but is not limited thereto. According to an embodiment, the number of logical addresses included in the address mapping information 301 may vary.

The trim bitmap information 302 may include trim information of the plurality of logical addresses LA1 to LA32 included in the address mapping information 301. At this time, the trim information may include one of a map state or a trim state, i.e., an unmap state. In an embodiment, the map state may indicate information that a specific logical address is mapped to a specific physical address. In an embodiment, the trim state may indicate information that a specific logical address is unmapped from a physical address.

In an embodiment, the trim bitmap information 302 may include a plurality of bits indicating the trim information of the plurality of logical addresses. For example, when a specific bit included in the trim bitmap information 302 is set to 0, a logical address corresponding to the specific bit may be in the map state. As another example, when a specific bit included in the trim bitmap information 302 is set to 1, a logical address corresponding to the specific bit may be in the trim state.

In an embodiment, the trim bitmap information 302 may change the trim information of the plurality of logical addresses through a memset function. For example, when an unset operation is performed on a specific bit included in the trim bitmap information 302, trim information of a logical address corresponding to the corresponding bit may be changed to the map state. As another example, when a set operation is performed on a specific bit included in the trim bitmap information 302, trim information of a logical address corresponding to the corresponding bit may be changed to the trim state.

In an embodiment, the trim bitmap information 302 may include trim information of logical address groups each including at least two or more logical addresses among the plurality of logical addresses LA1 to LA32 provided from the host 400. Specifically, the plurality of bits included in the trim bitmap information 302 may indicate the trim information of the plurality of logical address groups, respectively. For example, a bit of first trim information Trim 1 included in the trim bitmap information 302 may indicate trim information of a group of the first to fourth logical addresses LA1 to LA4. In addition, a bit of second trim information Trim 2 included in the trim bitmap information 302 may indicate trim information of a group of the fifth to eighth logical addresses LA5 to LA8. In addition, a bit of third trim information Trim 3 included in the trim bitmap information 302 may indicate trim information of a group of the ninth to twelfth logical addresses LA9 to LA12. In addition, a bit of fourth trim information Trim 4 included in the trim bitmap information 302 may indicate trim information of a group of the thirteenth to sixteenth logical addresses LA13 to LA16. In addition, a bit of eighth trim information Trim 8 included in the trim bitmap information 302 may indicate trim information of a group of the twenty-ninth to thirty-second logical addresses LA29 to LA32.

In FIG. 2, one bit included in the trim bitmap information 302 indicates trim information for four logical addresses, but it is not limited thereto. According to an embodiment, the number of logical addresses corresponding to one bit included in the trim bitmap information 302 may vary.

In an embodiment, when receiving a trim request from the host 400, the memory controller 200 may change the map state of the trim-requested logical addresses in the trim bitmap information 302. In an embodiment, the trim request may be referred to as an unmap request. For example, when the memory controller 200 receives a trim request for the ninth to sixteenth logical addresses LA9 to LA16 from the host 400, the memory controller 200 may change the third trim information Trim 3 and the fourth trim information Trim 4 each including some of the trim-requested logical addresses LA9 to LA16 to the trim state in the trim bitmap information 302. Thereafter, the memory controller 200 may provide a response signal as a response to the trim request to the host 400. In addition, the memory controller 200 may change the mapping information of the ninth to sixteenth logical addresses LA9 to LA16 to the trim state T in the address mapping information 301 based on the third trim information Trim 3 and the fourth trim information Trim 4 of the trim bitmap information 302 during an internal operation such as the read operation and the program operation. Thereafter, the memory controller 200 may change the third trim information Trim 3 and the fourth trim information Trim 4 to the map state.

Accordingly, the storage device 50 may reduce a time required to update the address mapping information 301 according to the trim request of the host 400 by updating the address mapping information 301 during the internal operation using the trim bitmap information 302.

As the number of logical addresses corresponding to one bit (i.e., a piece of the trim information) included in the trim bitmap information 302 decreases, a time for reflecting the trim information of the trim bitmap information 302 to the address mapping information 301 is decreased, but a time required to change the trim information of the trim bitmap information 302 is increased. Conversely, as the number of logical addresses corresponding to one bit included in the trim bitmap information 302 increases, the time required to change the trim information of the trim bitmap information 302 is decreased, but the time for reflecting the trim information of the trim bitmap information 302 to the address mapping information 301 is increased.

Therefore, according to an embodiment of the present disclosure, the time required to update the address mapping information 301 according to the trim request of the host 400 may be reduced, by changing the address mapping information 301 based on different trim bitmap information respectively representing trim states of groups each comprising different numbers of logical addresses.

Figure 3:
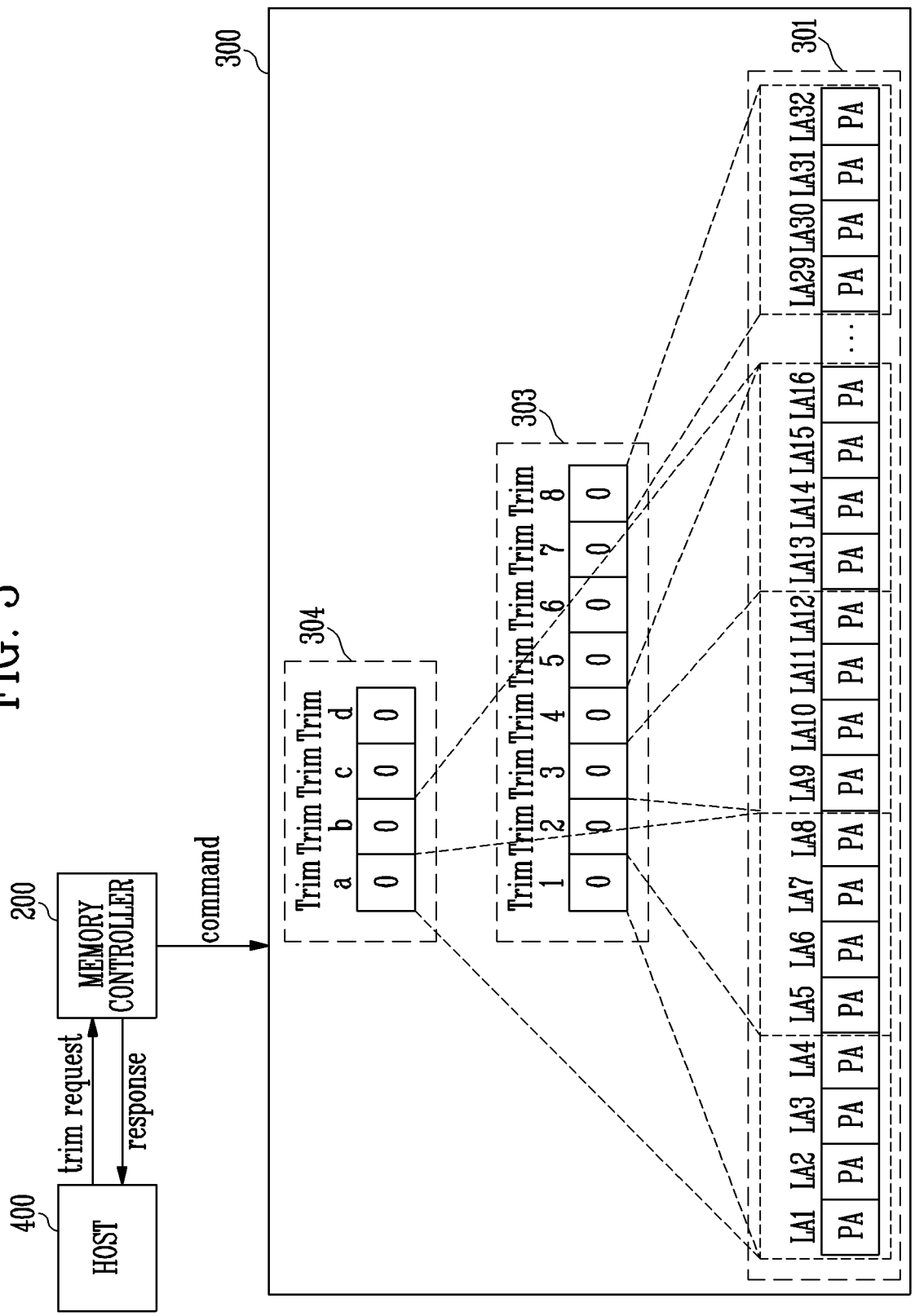
FIG. 3 is a diagram illustrating a different trim bitmap information according to an embodiment of the present disclosure.

FIG. 3 is a diagram illustrating a different trim bitmap information according to an embodiment of the present disclosure.

Referring to FIG. 3, the buffer memory 300 may store address mapping information 301, first trim bitmap information 303, and second trim bitmap information 304. At this time, the address mapping information 301 may indicate the address mapping information 301 of FIG. 2.

In FIG. 3, the address mapping information 301 includes a mapping relationship between first to thirty-second logical addresses LA1 to LA32 and physical addresses PA, but is not limited thereto. According to an embodiment, the number of logical addresses included in the address mapping information 301 may vary.

The first trim bitmap information 303 and the second trim bitmap information 304 may include trim information of the plurality of logical addresses LA1 to LA32 included in the address mapping information 301.

In an embodiment, each of the first trim bitmap information 303 and the second trim bitmap information 304 may include trim information of logical address groups including at least two or more logical addresses among the plurality of logical addresses LA1 to LA32 provided from the host 400. Specifically, a plurality of bits included in each of the first trim bitmap information 303 and the second trim bitmap information 304 may respectively indicate the trim information of a plurality of logical address groups.

In an embodiment, the first trim bitmap information 303 may include trim information of a plurality of first logical address groups each including a first number of logical addresses that are at least two or more logical addresses of the plurality of logical addresses. At this time, the first number may indicate the number of logical addresses corresponding to one bit (i.e., a piece of the trim information) included in the first trim bitmap information 303.

For example, the first trim bitmap information 303 may include trim information of logical address groups each including four logical addresses. First trim information Trim 1 included in the first trim bitmap information 303 may indicate trim information of the first to fourth logical addresses LA1 to LA4. In addition, second trim information Trim 2 included in the first trim bitmap information 303 may indicate trim information of the fifth to eighth logical addresses LA5 to LA8. In addition, third trim information Trim 3 included in the first trim bitmap information 303 may indicate trim information of the ninth to twelfth logical addresses LA9 to LA12. In addition, fourth trim information Trim 4 included in the first trim bitmap information 303 may indicate trim information of the thirteenth to sixteenth logical addresses LA13 to LA16. In addition, eighth trim information Trim 8 included in the first trim bitmap information 303 may indicate trim information of the twenty-ninth to thirty-second logical addresses LA29 to LA32.

In FIG. 3, one bit (i.e., a piece of the trim information) included in the first trim bitmap information 303 indicates trim information for four logical addresses, but it is not limited thereto. According to an embodiment, the number of logical addresses corresponding to one bit included in the first trim bitmap information 303 may vary.

In an embodiment, the second trim bitmap information 304 may include trim information of a plurality of second logical address groups each including a second number of logical addresses greater than the first number of the plurality of logical addresses. At this time, the second number may indicate the number of logical addresses corresponding to one bit (i.e., a piece of trim information) included in the second trim bitmap information 304. In an embodiment, the second number may be an integer multiple of the first number.

For example, the second trim bitmap information 304 may include trim information of logical address groups each including eight logical addresses. An a-th trim information Trim a included in the second trim bitmap information 304 may indicate trim information of the first to eighth logical addresses LA1 to LA8. In addition, a b-th trim information Trim b included in the second trim bitmap information 304 may indicate trim information of the ninth to sixteenth logical addresses LA9 to LA16. That is, the number of logical addresses corresponding to one bit (i.e., a piece of the trim information) included in the second trim bitmap information 304 may be greater than the number of logical addresses corresponding to one bit included in the first trim bitmap information 303.

In the above-described example, the second number is twice the first number, but it is not limited thereto, and a multiple difference between the second number and the first number may vary according to an embodiment.

In an embodiment, each of the plurality of second logical address groups may correspond to at least two or more first logical address groups among the plurality of first logical address groups. For example, the logical addresses LA1 to LA8 corresponding to the a-th trim information Trim a included in the second trim bitmap information 304 may correspond to the logical addresses LA1 to LA8 corresponding to the first trim information Trim 1 and the second trim information Trim 2 included in the first trim bitmap information 303. In addition, the logical addresses LA9 to LA16 corresponding to the b-th trim information Trim b included in the second trim bitmap information 304 may correspond to the logical addresses LA9 to LA16 corresponding to the third trim information Trim 3 and the fourth trim information Trim 4 included in the first trim bitmap information 303. That is, each of the plurality of bits (i.e., the trim information) included in the second trim bitmap information 304 may correspond to at least two or more bits among the plurality of bits included in the first trim bitmap information 303.

In an embodiment, the memory controller 200 may change the map state of the trim-requested logical addresses in one of the address mapping information 301, the first trim bitmap information 303, or the second trim bitmap information 304 based on the number of logical addresses that are trim-requested from the host 400. For example, when receiving the trim request from the host 400, the memory controller 200 may determine one of the address mapping information 301, the first trim bitmap information 303, and the second trim bitmap information 304 based on the number of logical addresses that are trim-requested from the host 400.

Thereafter, the memory controller 200 may change the map state of the logical addresses in the determined one of the address mapping information 301, the first trim bitmap information 303, or the second trim bitmap information 304.

In an embodiment, the memory controller 200 may provide the response signal for a response to the trim request to the host 400 after changing the map state of the trim-requested logical addresses in the determined one of the address mapping information 301, the first trim bitmap information 303, or the second trim bitmap information 304.

In an embodiment, when the map state of the trim-requested logical addresses is changed in one of the first trim bitmap information 303 and the second trim bitmap information 304, the memory controller 200 may change the mapping information of the trim-requested logical addresses to the trim state in the address mapping information 301 based on the first trim bitmap information 303 or the second trim bitmap information 304, after providing the response signal to the host 400.

For example, the memory controller 200 may change the mapping information of the trim-requested logical addresses to the trim state in the address mapping information 301 based on the first trim bitmap information 303 or the second trim bitmap information 304 during the internal operation such as the read operation and the program operation. Thereafter, the memory controller 200 may change the trim information corresponding to the trim-requested logical addresses to the map state in the first trim bitmap information 303 or the second trim bitmap information 304.

Figure 4:
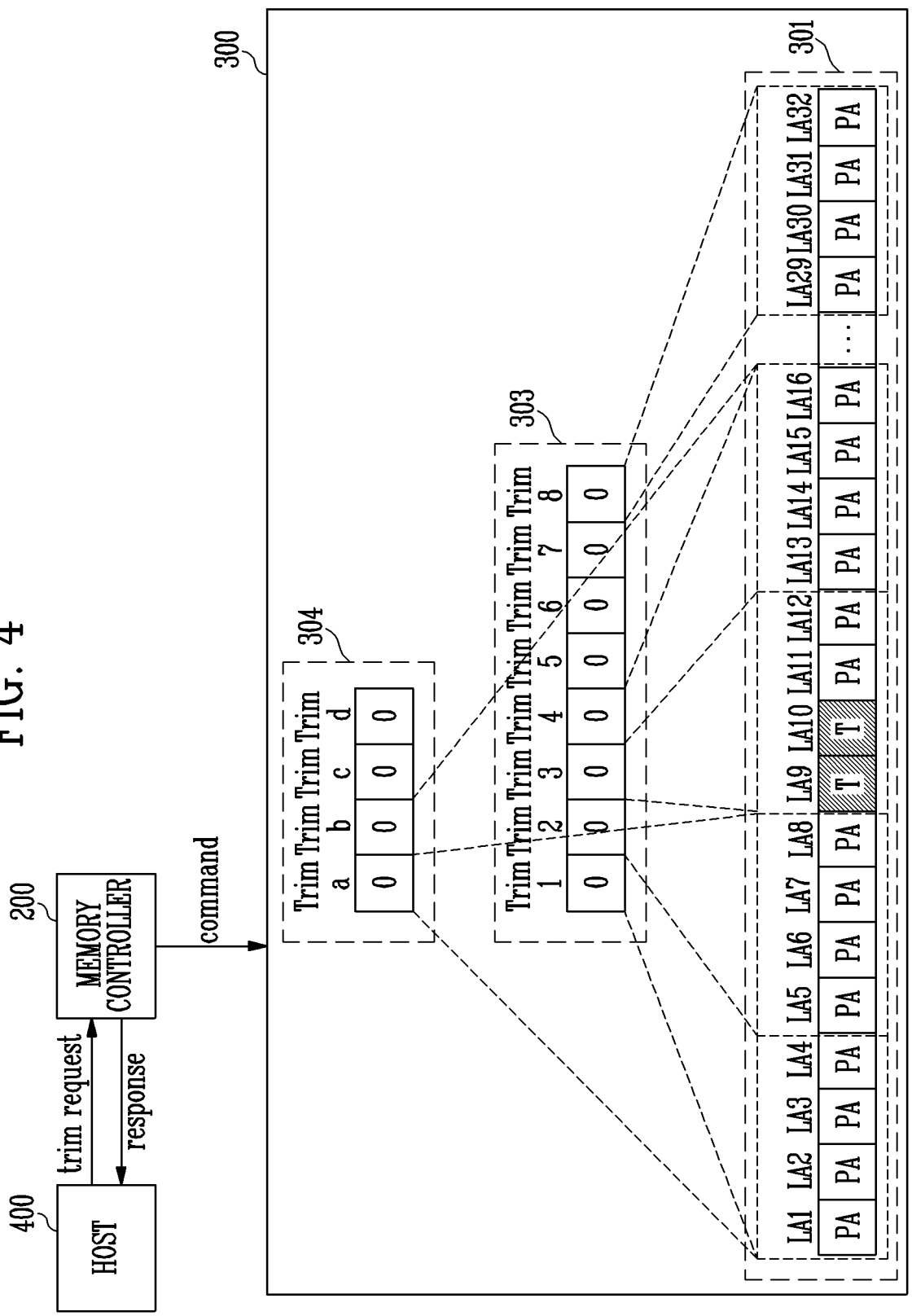
FIG. 4 is a diagram illustrating an example in which a map state is changed in address mapping information according to an embodiment of the present disclosure.

FIG. 4 is a diagram illustrating an example in which the map state is changed in the address mapping information 301 according to an embodiment of the present disclosure.

In FIG. 4, the buffer memory 300 may store address mapping information 301, first trim bitmap information 303, and second trim bitmap information 304. At this time, the address mapping information 301, the first trim bitmap information 303, and the second trim bitmap information 304 may indicate the address mapping information 301, the first trim bitmap information 303, and the second trim bitmap information 304 of FIG. 3, respectively. In addition, it is assumed that the first number is four and the second number is eight.

In an embodiment, when the number of trim-requested logical addresses is less than the first number, the memory controller 200 may change the mapping information of the trim-requested logical addresses to the trim state in the address mapping information 301.

Referring to FIG. 4, the memory controller 200 receives the trim request for the ninth logical address LA9 and the tenth logical address LA10 from the host 400.

Since the number of trim-requested logical addresses LA9 and LA10 is less than four, i.e., the first number, the memory controller 200 may change the mapping information of the trim-requested logical addresses LA9 and LA10 to the trim state T in the address mapping information 301. Thereafter, the memory controller 200 may provide the response signal for a response to the trim request to the host 400.

FIGS. 5A and 5B are diagrams illustrating an example in which a map state is changed in the address mapping information 301 using the first trim bitmap information 303 according to an embodiment of the present disclosure.

Specifically, FIG. 5A is a diagram illustrating an example in which the first trim bitmap information 303 is updated according to the trim request from the host 400, and FIG. 5B is a diagram illustrating an example in which the map state is changed in the address mapping information 301 using the updated first trim bitmap information 303.

In FIGS. 5A and 5B, the buffer memory 300 may store address mapping information 301, first trim bitmap information 303, and second trim bitmap information 304. At this time, the address mapping information 301, the first trim bitmap information 303, and the second trim bitmap information 304 may indicate the address mapping information 301, the first trim bitmap information 303, and the second trim bitmap information 304 of FIG. 3, respectively. In addition, it is assumed that the first number is four and the second number is eight.

In an embodiment, when the number of trim-requested logical addresses is equal to or greater than the first number and less than the second number, the memory controller 200 may change trim information of the trim requested first logical address group including the trim-requested logical addresses among the plurality of first logical address groups in the first trim bitmap information 303.

Referring to FIG. 5A, the memory controller 200 receives the trim request for the ninth to twelfth logical addresses LA9 to LA12 from the host 400.

Since the number of trim-requested logical addresses LA9 to LA12 is four, i.e., equal to the first number, the memory controller 200 may change the third trim information Trim 3 on the logical address group including the trim-requested logical addresses LA9 to LA12 to a trim state 1 in the first trim bitmap information 303. Thereafter, the memory controller 200 may provide the response signal for a response to the trim request to the host 400.

In an embodiment, the memory controller 200 may change the mapping information of the trim-requested logical addresses among the plurality of logical addresses to the trim state in the address mapping information 301, based on the trim information of the trim-requested first logical address group stored in the first trim bitmap information 303.

In addition, in an embodiment, the memory controller 200 may change the trim information of the trim-requested first logical address group to the map state in the first trim bitmap information 303 after changing the mapping information of the trim-requested logical addresses to the trim state in the address mapping information 301.

Referring to FIG. 5B, the memory controller 200 may change the mapping information of the logical addresses LA9 to LA12 corresponding to the third trim information Trim 3 to the trim state T in the address mapping information 301 based on the third trim information Trim 3 stored in the first trim bitmap information 303. Thereafter, the memory controller 200 may change the third trim information Trim 3 to a map state 0.

Figure 6A:
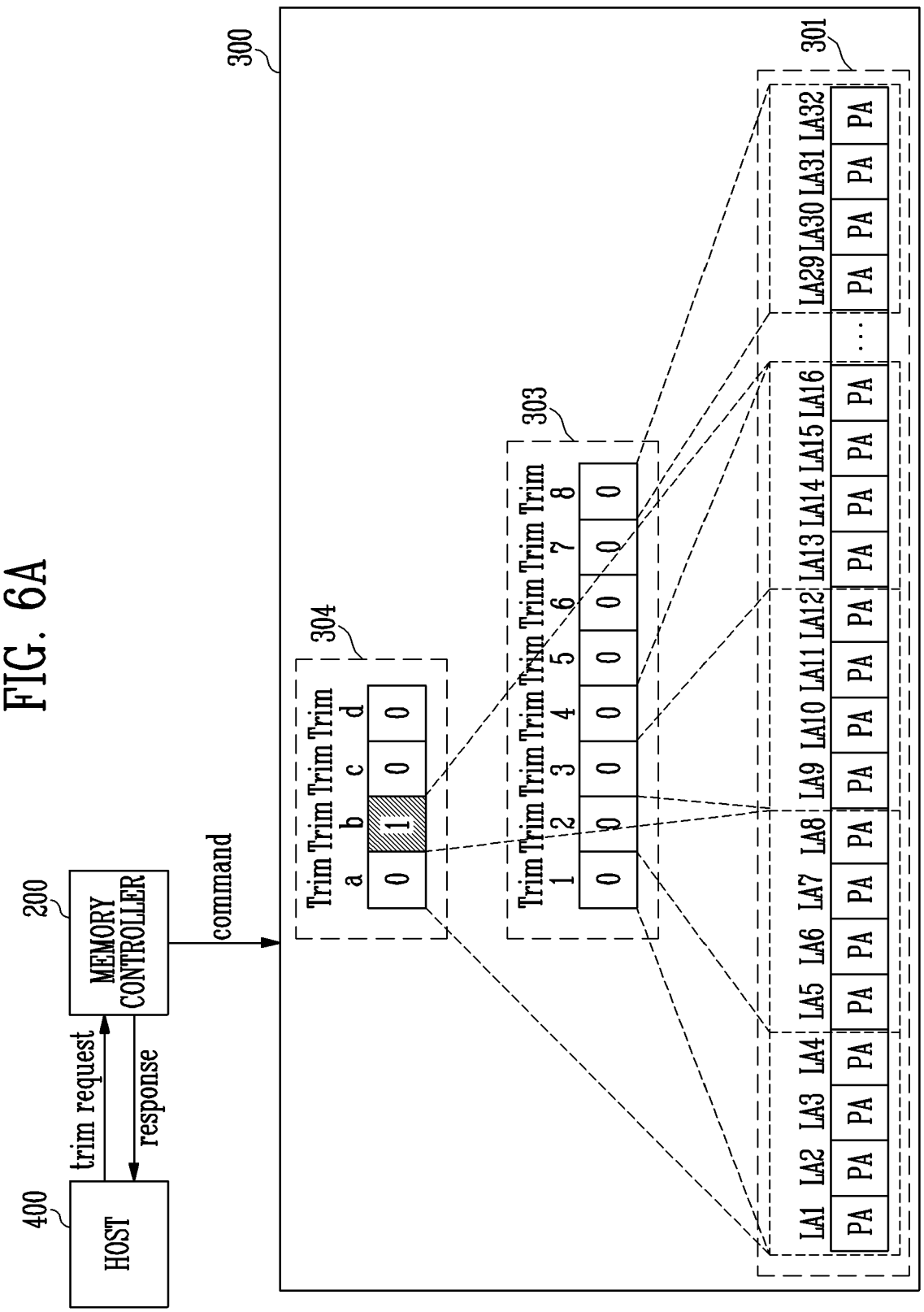
FIGS. 6A to 6C are diagrams illustrating an example in which a map state is changed in address mapping information using second trim bitmap information according to an embodiment of the present disclosure.
Figure 6B:
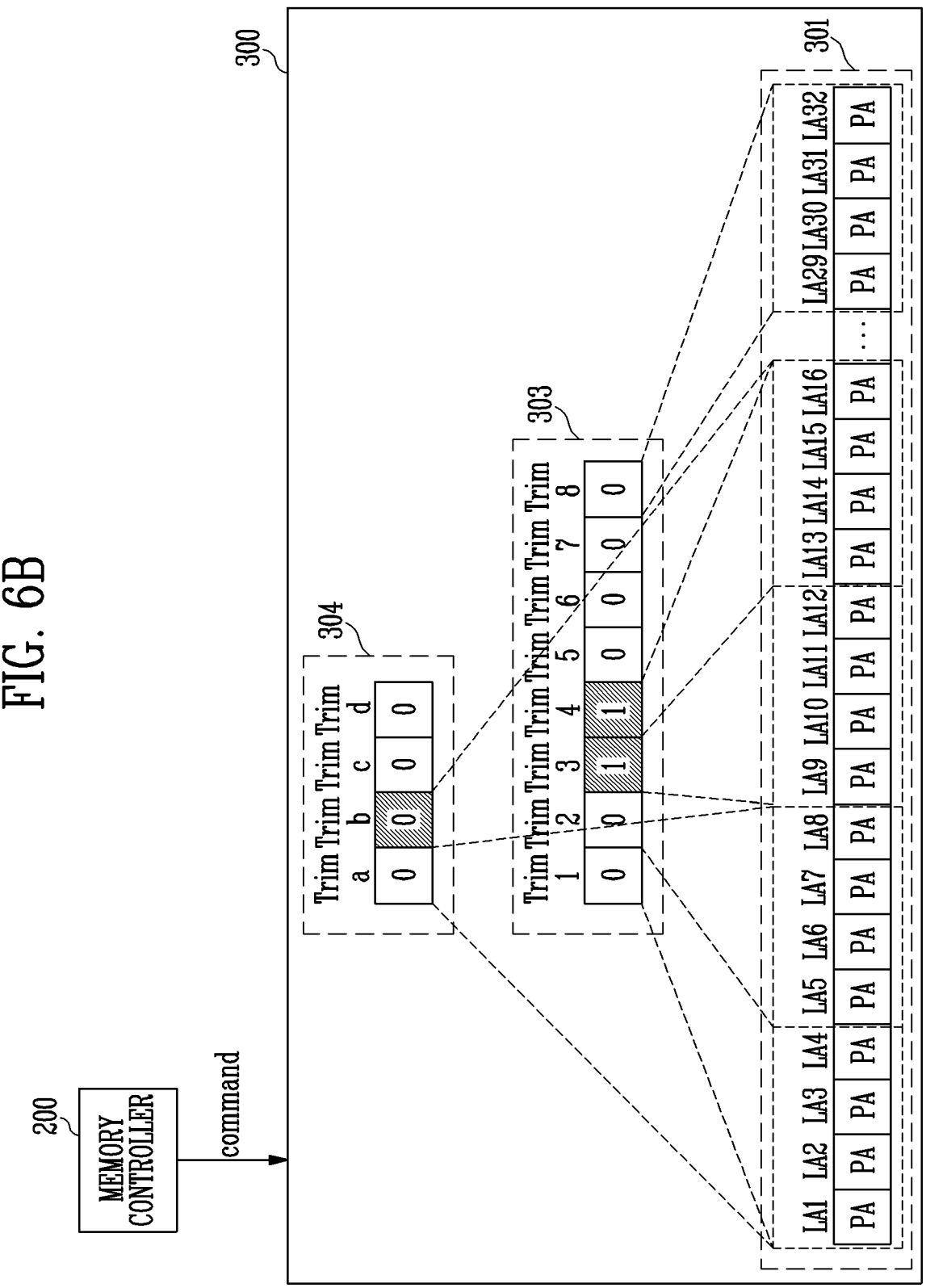
Figure 6C:
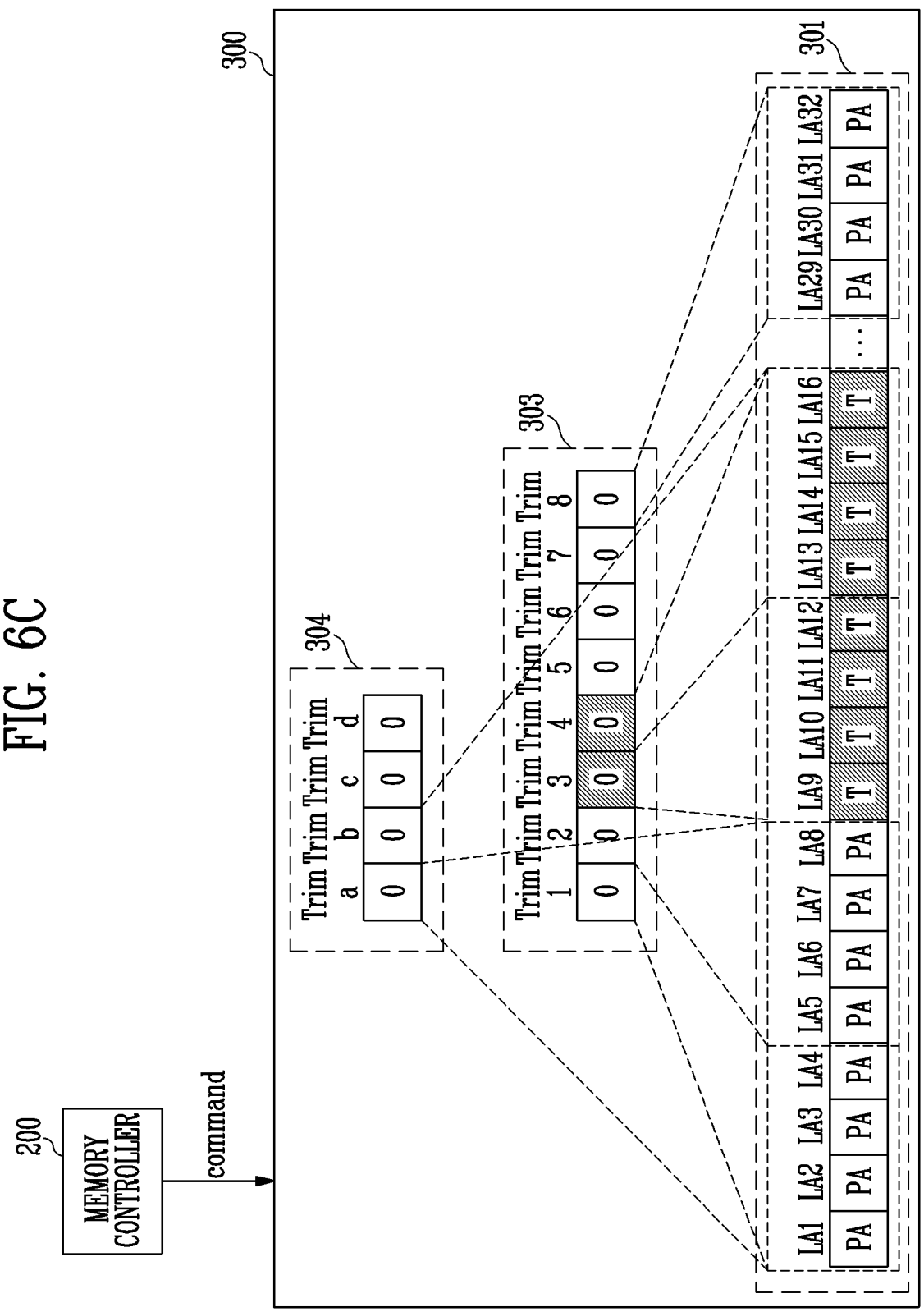

FIGS. 6A to 6C are diagrams illustrating an example in which a map state is changed in the address mapping information 301 using the second trim bitmap information 304 according to an embodiment of the present disclosure.

Specifically, FIG. 6A is a diagram illustrating an example in the second trim bitmap information 304 is updated according to the trim request from the host 400, FIG. 6B is a diagram illustrating an example in which the first trim bitmap information 303 is updated based on the updated second trim bitmap information 304, and FIG. 6C is a diagram illustrating an example in which the map state is changed in the address mapping information 301 using the updated first trim bitmap information 303.

In FIGS. 6A to 6C, the buffer memory 300 may store address mapping information 301, first trim bitmap information 303, and second trim bitmap information 304. At this time, the address mapping information 301, the first trim bitmap information 303, and the second trim bitmap information 304 may indicate the address mapping information 301, the first trim bitmap information 303, and the second trim bitmap information 304 of FIG. 3, respectively. In addition, it is assumed that the first number is four and the second number is eight.

In an embodiment, when the number of trim-requested logical addresses is equal to or greater than the second number, the memory controller 200 may change trim information of the trim requested second logical address group including the trim-requested logical addresses among the plurality of second logical address groups in the second trim bitmap information 304.

Referring to FIG. 6A, the memory controller 200 receives the trim request for the ninth to sixteenth logical addresses LA9 to LA16 from the host 400.

Since the number of trim-requested logical addresses LA9 to LA16 is eight, i.e., equal to the second number, the memory controller 200 may change the b-th trim information Trim b indicating the trim information on the logical address group including the trim-requested logical addresses LA9 to LA16 to the trim state 1 in the second trim bitmap information 304. Thereafter, the memory controller 200 may provide the response signal for a response to the trim request to the host 400.

In an embodiment, the memory controller 200 may change the trim information of the trim-requested first logical address groups each including some of the trim-requested logical addresses among the plurality of first logical address groups to the trim state in the first trim bitmap information 303, based on the trim information of the trim-requested second logical address group stored in the second trim bitmap information 304.

In addition, in an embodiment, the memory controller 200 may change the trim information of the trim-requested second logical address group to the map state in the second trim bitmap information 304 after changing the trim information of the trim-requested first logical address groups to the trim state in the first trim bitmap information 303.

Referring to FIG. 6B, the memory controller 200 may change the third trim information Trim 3 and the fourth trim information Trim 4 indicating the trim information on the logical address groups each including some of the logical addresses LA9 to LA16 corresponding to the b-th trim information Trim b to the trim state 1 in the first trim bitmap information 303 based on the b-th trim information Trim b stored in the second trim bitmap information 304. Thereafter, the memory controller 200 may change the b-th trim information Trim b to the map state 0.

In an embodiment, the memory controller 200 may change the mapping information of the trim-requested logical addresses among the plurality of logical addresses to the trim state in the address mapping information 301, based on the trim information of the trim-requested first logical address groups stored in the first trim bitmap information 303.

In addition, in an embodiment, the memory controller 200 may change the trim information of the trim-requested first logical address groups to the map state in the first trim bitmap information 303 after changing the mapping information of the trim-requested logical addresses to the trim state in the address mapping information 301.

Referring to FIG. 6C, the memory controller 200 may change the mapping information of the logical addresses LA9 to LA16 corresponding to the third trim information Trim 3 and the fourth trim information Trim 4 to the trim state T in the address mapping information 301 based on the third trim information Trim 3 and the fourth trim information Trim 4 stored in the first trim bitmap information 303. Thereafter, the memory controller 200 may change the third trim information Trim 3 and the fourth trim information Trim 4 to the map state 0.

According to an embodiment of the present disclosure, the trim state by the trim request may be reflected in an order of the second trim bitmap information 304, the first trim bitmap information 303, and the address mapping information 301. Therefore, an operation speed of the storage device 50 may be improved, thereby improving quality of service (QoS) of the storage device 50.

Figure 7:
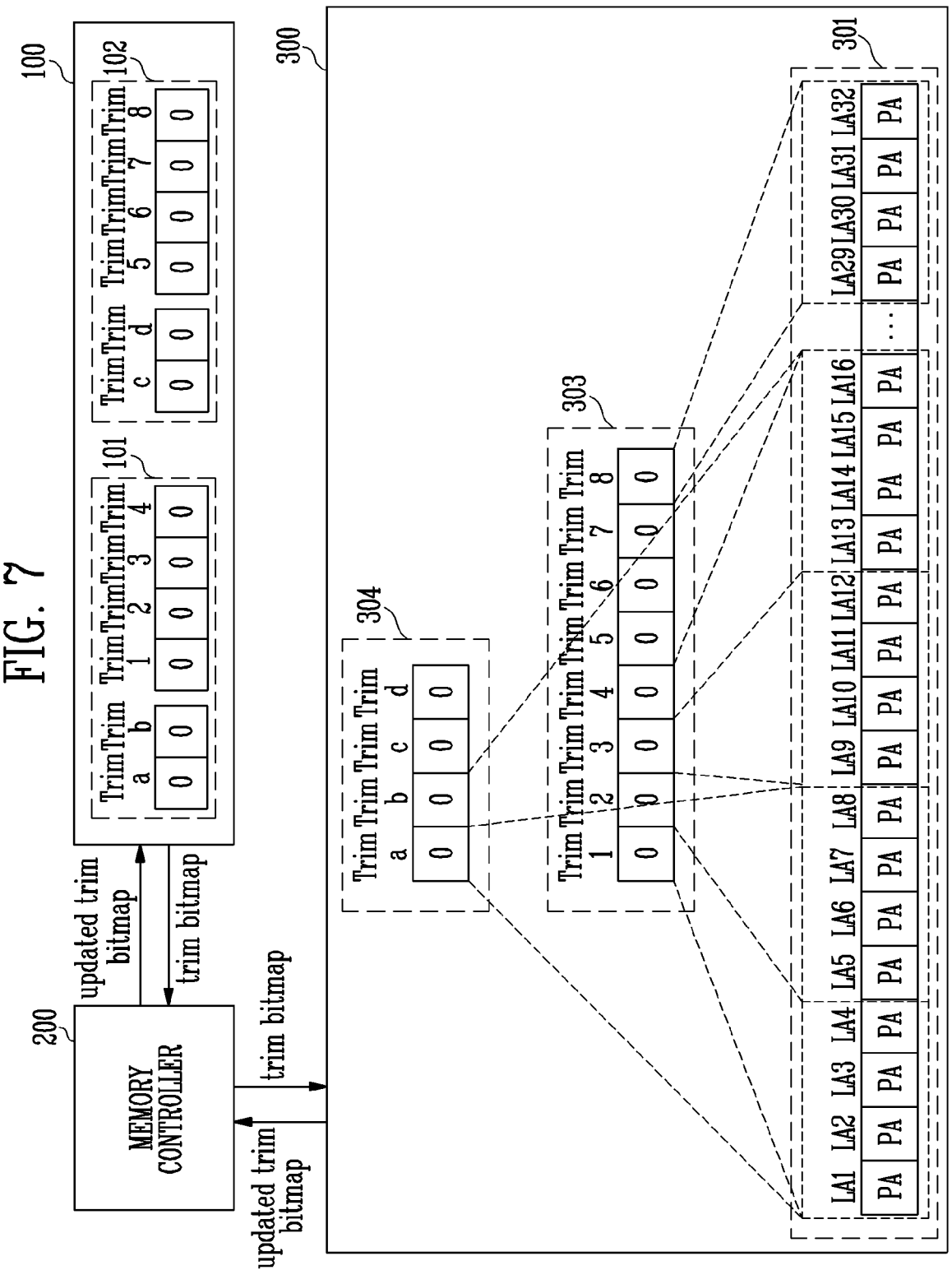
FIG. 7 is a diagram illustrating an example in which first trim bitmap information and second trim bitmap information are stored in a memory device according to an embodiment of the present disclosure.

FIG. 7 is a diagram illustrating an example in which the first trim bitmap information 303 and the second trim bitmap information 304 are stored in the memory device 100 according to an embodiment of the present disclosure.

In FIG. 7, the buffer memory 300 may store address mapping information 301, first trim bitmap information 303, and second trim bitmap information 304. At this time, the address mapping information 301, the first trim bitmap information 303, and the second trim bitmap information 304 may indicate the address mapping information 301, the first trim bitmap information 303, and the second trim bitmap information 304 of FIG. 3, respectively. In addition, it is assumed that the first number is four and the second number is eight.

In an embodiment, the memory controller 200 may control the memory device 100 to store the trim information of each of the plurality of second logical address groups and the trim information of the first logical address groups corresponding to each of the plurality of second logical address groups in the same memory area in the memory device 100. At this time, the memory area may include a memory cell, a page, a memory block, and the like.

Referring to FIG. 7, the memory controller 200 may read trim bitmap information (trim bitmap) from the memory device 100 and provide the trim bitmap information (trim bitmap) to the buffer memory 300. At this time, the trim bitmap information (trim bitmap) may include the first trim bitmap information 303 and the second trim bitmap information 304.

In addition, the memory controller 200 may read updated trim bitmap information (updated trim bitmap) from the buffer memory 300 and provide the updated trim bitmap information (updated trim bitmap) to the memory device 100. At this time, the memory device 100 may store the a-th trim information Trim a and the b-th trim information Trim b including the trim information on the corresponding logical addresses in the same memory area 101 together with the first to fourth trim information Trim 1 to Trim 4. In addition, the memory device 100 may store a c-th trim information Trim c and a d-th trim information Trim d including the trim information on the corresponding logical addresses in the same memory area 102 together with the fifth to eighth trim information Trim 5 to Trim 8.

Although not shown in FIG. 7, the memory device 100 may store the address mapping information 301.

According to an embodiment of the present disclosure, the trim information on the same logical addresses is stored in the same memory area in the memory device 100. Therefore, consistency between the trim information may be maintained to increase accuracy of the trim information.

FIG. 8 is a flowchart illustrating a method of operating a storage device according to an embodiment of the present disclosure.

The method shown in FIG. 8 may be performed by the storage device 50 shown in FIG. 1.

Referring to FIG. 8, in operation S801, the storage device 50 may generate the address mapping information including the mapping relationship between the plurality of logical addresses provided from the host 400 and the plurality of physical addresses corresponding to the plurality of pages.

In operation S803, the storage device 50 may generate the first trim bitmap information 303 including the trim information of the plurality of first logical address groups each including the first number of logical addresses that are at least two or more logical addresses of the plurality of logical addresses.

In operation S805, the storage device 50 may generate the second trim bitmap information 304 including the trim information of the plurality of second logical address groups each including the second number of logical addresses greater than the first number of the plurality of logical addresses. At this time, the second number may be an integer multiple of the first number.

In operation S807, the storage device 50 may receive the trim request from the host 400.

In operation S809, the storage device 50 may determine whether the number of trim-requested logical addresses is less than the first number.

As a result of the determination in operation S809, when the number of trim-requested logical addresses is less than the first number, in operation S811, the storage device 50 may change the map state of the trim-requested logical addresses in the address mapping information 301.

As a result of the determination in operation S809, when the number of trim-requested logical addresses is equal to or greater than the first number, in operation S813, the storage device 50 may determine whether the number of trim-requested logical addresses is less than the second number.

As a result of the determination in operation S813, when the number of trim-requested logical addresses is less than the second number, in operation S815, the storage device 50 may change the map state of the trim-requested logical addresses in the first trim bitmap information 303.

As a result of the determination in operation S813, when the number of trim-requested logical addresses is equal to or greater than the second number, in operation S817, the storage device 50 may change the map state of the trim-requested logical addresses in the second trim bitmap information 304.

FIG. 9 is a flowchart illustrating a method of changing the map state in the address mapping information 301 according to an embodiment of the present disclosure.

The method shown in FIG. 9 may be performed by the storage device 50 shown in FIG. 1.

FIG. 9 illustrates a method of operating the storage device 50 when the number of logical addresses requested to be trimmed from the host 400 is less than the first number.

Referring to FIG. 9, in operation S901, the storage device 50 may change the mapping information of the trim-requested logical addresses to the trim state in the address mapping information 301.

In operation S903, the storage device 50 may provide the response signal for the trim request to the host 400.

FIG. 10 is a flowchart illustrating a method of changing the map state in the address mapping information 301 using the first trim bitmap information 303 according to an embodiment of the present disclosure.

The method shown in FIG. 10 may be performed by the storage device 50 shown in FIG. 1.

FIG. 10 illustrates a method of operating the storage device 50 when the number of logical addresses requested to be trimmed from the host 400 is equal to or greater than the first number and less than the second number.

Referring to FIG. 10, in operation S1001, the storage device 50 may change the trim information of the trim-requested first logical address group including the trim-requested logical addresses among the plurality of first logical address groups to the trim state in the first trim bitmap information 303.

In operation S1003, the storage device 50 may provide the response signal for the trim request to the host 400.

In operation S1005, the storage device 50 may change the mapping information of the trim-requested logical addresses among the plurality of logical addresses to the trim state in the address mapping information 301, based on the trim information of the trim-requested first logical address group stored in the first trim bitmap information 303.

In operation S1007, the storage device 50 may change the trim information of the trim-requested first logical address group to the map state in the first trim bitmap information 303.

FIG. 11 is a flowchart illustrating a method of changing the map state in address mapping information 301 using the second trim bitmap information 304 according to an embodiment of the present disclosure.

The method shown in FIG. 11 may be performed by the storage device 50 shown in FIG. 1.

FIG. 11 illustrates a method of operating the storage device 50 when the number of logical addresses requested to be trimmed from the host 400 is equal to or greater than the second number.

Referring to FIG. 11, in operation S1101, the storage device 50 may change the trim information of the trim-requested second logical address group including the trim-requested logical addresses among the plurality of second logical address groups to the trim state in the second trim bitmap information 304.

Referring to FIG. 11, in operation S1103, the storage device 50 may provide the response signal for the trim request to the host 400.

Referring to FIG. 11, in operation S1105, the storage device 50 may change the trim information of the trim-requested first logical address groups each including some of the trim-requested logical addresses among the plurality of first logical address groups to the trim state in the first trim bitmap information 303, based on the trim information of the trim-requested second logical address group stored in the second trim bitmap information 304.

Referring to FIG. 11, in operation S1107, the storage device 50 may change the trim information of the trim-requested second logical address group to the map state in the second trim bitmap information 304.

Referring to FIG. 11, in operation S1109, the storage device 50 may change the mapping information of the trim-requested logical addresses among the plurality of logical addresses to the trim state in the address mapping information 301, based on the trim information of the trim-requested first logical address groups stored in the first trim bitmap information 303.

Referring to FIG. 11, in operation S1111, the storage device 50 may change the trim information of the trim-requested first logical address groups to the map state in the first trim bitmap information 303.

Figure 12:
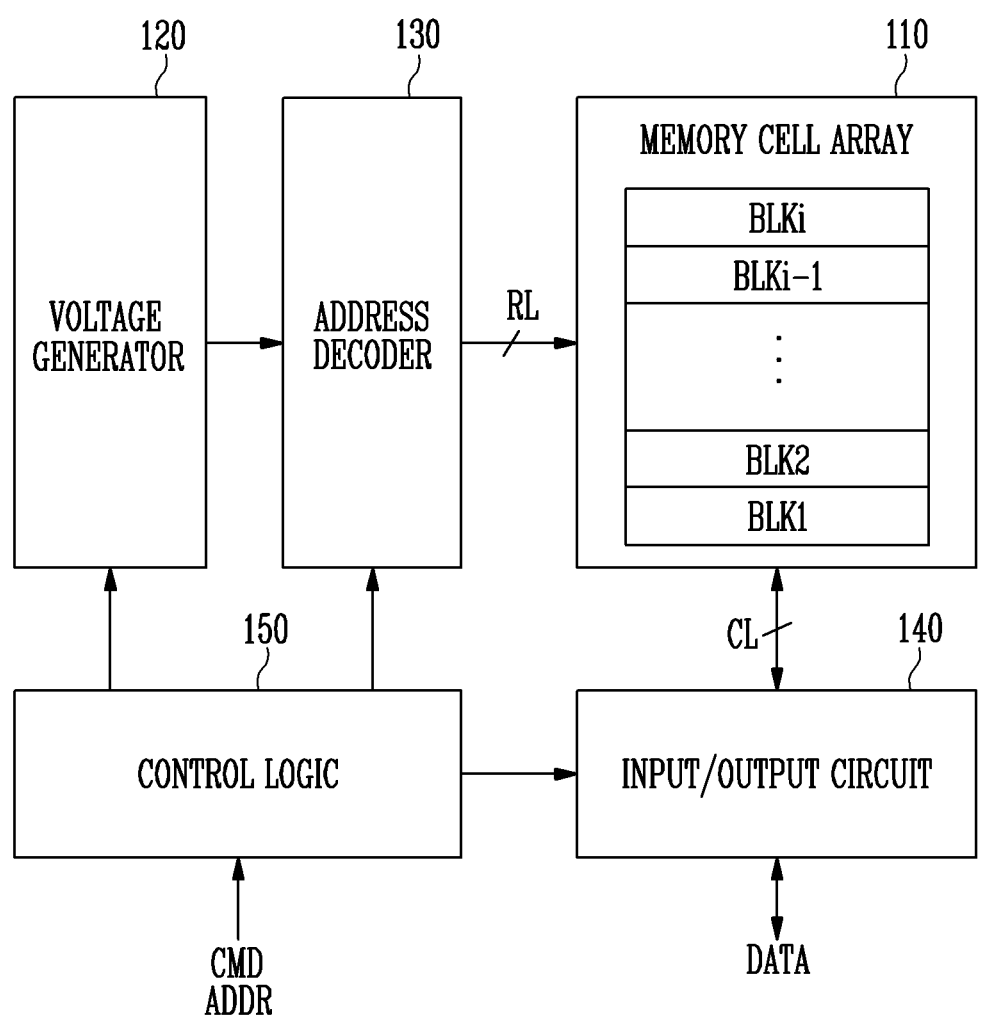
FIG. 12 is a diagram illustrating a memory device of FIG. 1.

FIG. 12 is a diagram illustrating the memory device of FIG. 1.

Referring to FIG. 12, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages Vop using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

According to an embodiment of the present disclosure, during the read operation, the address decoder 130 may apply a read voltage to a selected word line and a read pass voltage of a level higher than that of the read voltage to unselected word lines.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate various signals in response to the command CMD and the address ADDR to control the peripheral circuits.

Figure 13:
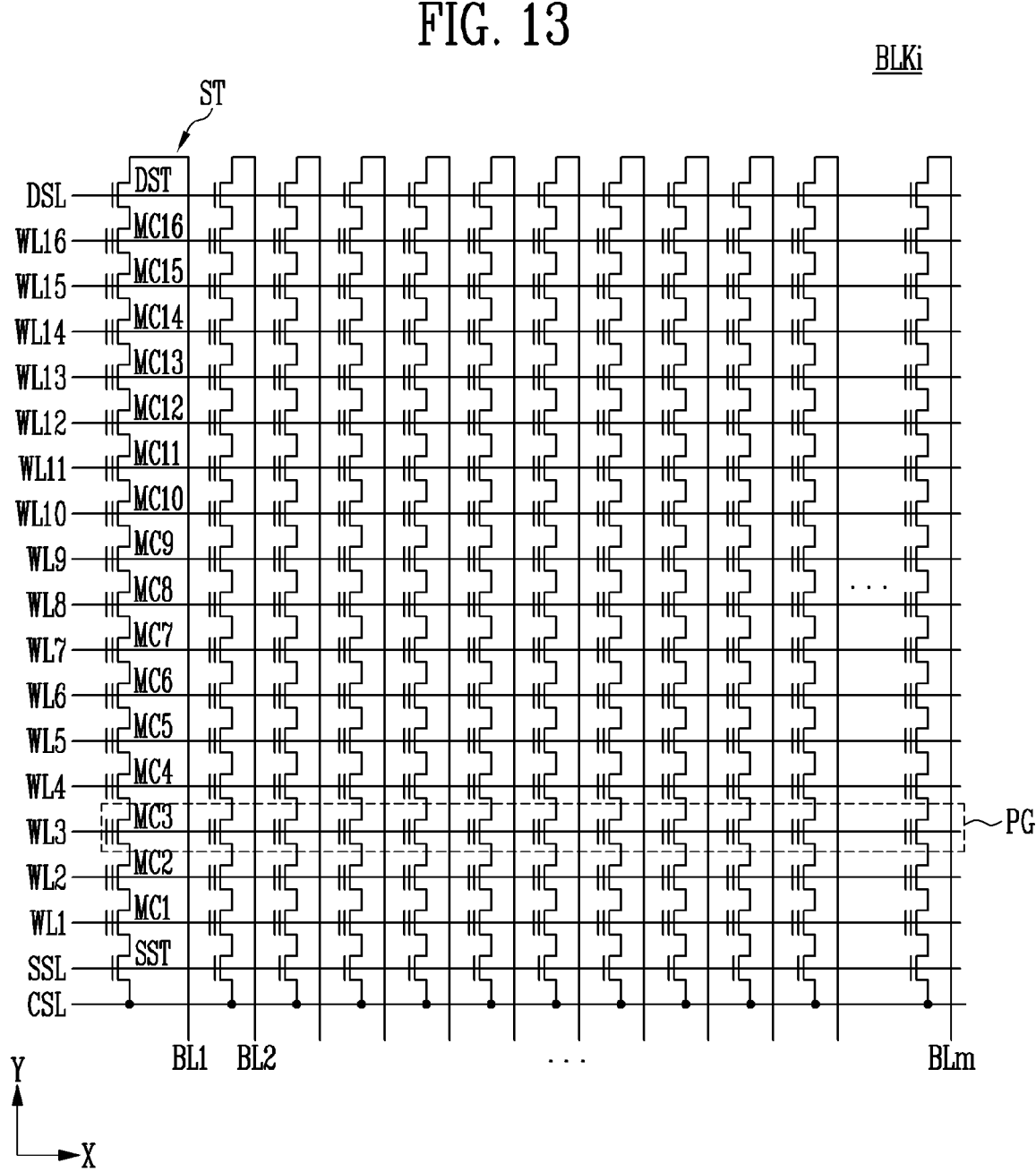
FIG. 13 is a diagram illustrating a configuration of any one of memory blocks of FIG. 12.

FIG. 13 is a diagram illustrating a configuration of one of the memory blocks of FIG. 12.

The memory block BLKi is one memory block BLKi among the memory blocks BLK1 to BLKi of FIG. 12.

Referring to FIG. 13, a plurality of word lines arranged in parallel with each other may be connected between a first select line and a second select line. Here, the first select line may be the source select line SSL, and the second select line may be the drain select line DSL. More specifically, the memory block BLKi may include a plurality of strings ST connected between the bit lines BL1 to BLm and a common source line CSL. The bit lines BL1 to BLm may be connected to the strings ST, respectively, and the common source line CSL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the common source line CSL and the first bit line BL1. One string ST may include at least one or more of the source select transistor SST and the drain select transistor DST, and may include more than the number of the memory cells MC1 to MC16 shown in the figure.

A source of the source select transistor SST may be connected to the common source line CSL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include the pages PG of the number of the word lines WL1 to WL16.

One memory cell may store one bit of data. This is commonly called a single level cell (SLC). In this case, one physical page PG may store one logical page (LPG) data. The one logical page (LPG) data may include data bits having the same number as cells included in one physical page PG.

The one memory cell may store two or more bits of data. In this case, one physical page PG may store two or more logical page (LPG) data.

Figure 14:
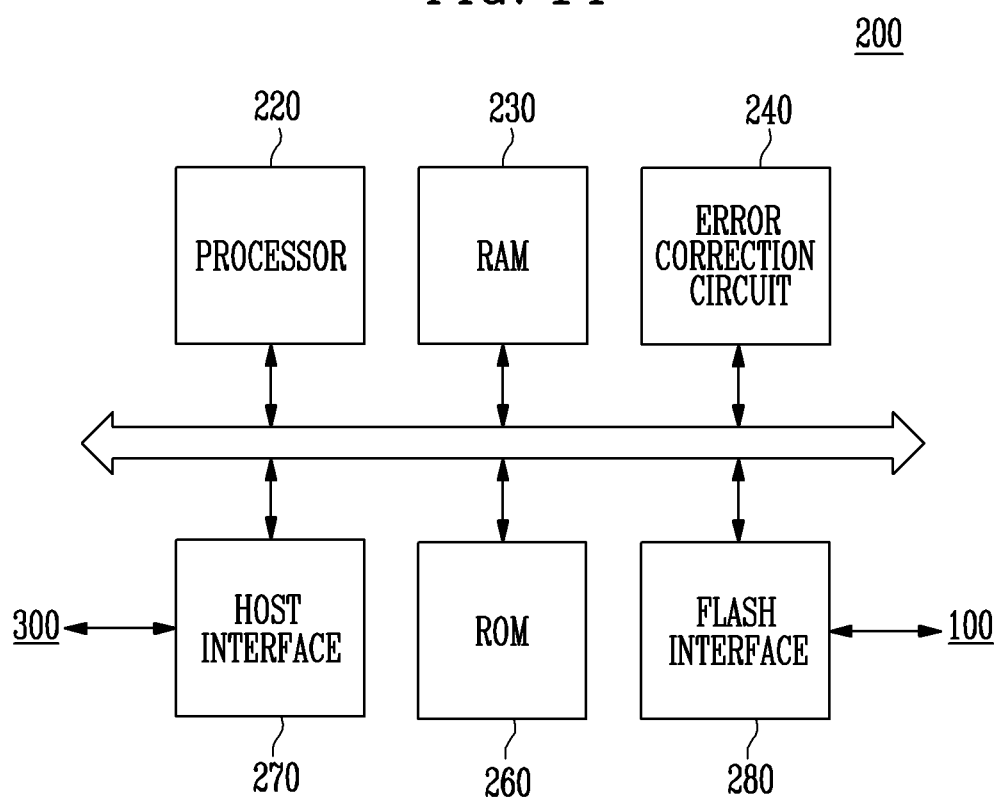
FIG. 14 is a diagram illustrating a memory controller of FIG. 1.

FIG. 14 is a diagram illustrating the memory controller of FIG. 1.

Referring to FIGS. 1 and 14, the memory controller 200 may include a processor 220, a RAM 230, an error correction circuit 240, a ROM 260, a host interface 270, and a flash interface 280.

The processor 220 may control an overall operation of the memory controller 200. The RAM 230 may be used as a buffer memory, a cache memory, an operation memory, and the like of the memory controller 200.

The error correction circuit 240 may perform error correction. The error correction circuit 240 may perform an error correction encoding (ECC encoding) based on data to be written to the memory device 100 through the flash interface 280. The error correction encoded data may be transferred to the memory device 100 through the flash interface 280. The error correction circuit 240 may perform error correction decoding (ECC decoding) on data received from the memory device 100 through the flash interface 280. For example, the error correction circuit 240 may be included in the flash interface 280 as a component of the flash interface 280.

The ROM 260 may store various pieces of information required for the memory controller 200 to operate in a firmware form.

The memory controller 200 may communicate with an external device (for example, the host 400, an application processor, and the like) through the host interface 270.

The memory controller 200 may communicate with the memory device 100 through the flash interface 280. The memory controller 200 may transmit a command CMD, an address ADDR, and a control signal CTRL to the memory device 100 through the flash interface 280 and receive data DATA. For example, the flash interface 280 may include a NAND interface.

Figure 15:
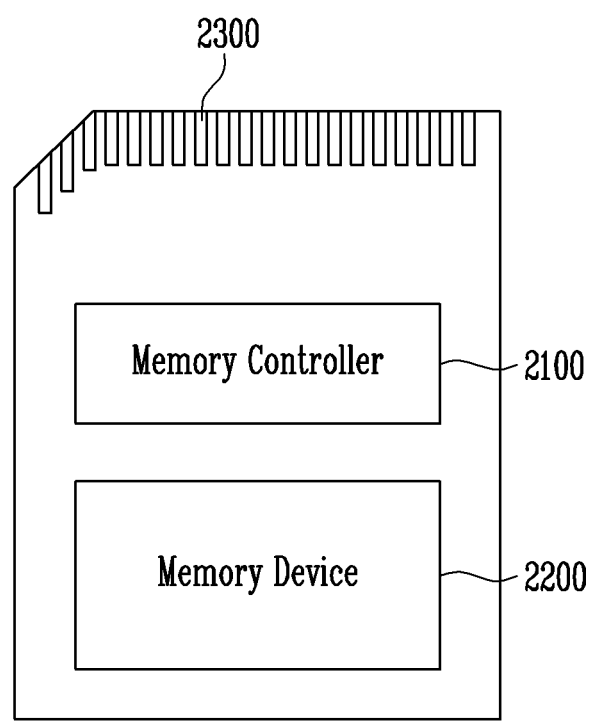
FIG. 15 is a block diagram illustrating a memory card system to which a storage device is applied according to an embodiment of the present disclosure.

FIG. 15 is a block diagram illustrating a memory card system to which a storage device is applied according to an embodiment of the present disclosure.

Referring to FIG. 15, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1. The memory device 2200 may be implemented identically to the memory device 100 described with reference to FIG. 1.

For example, the memory controller 2100 may include components such as a random access memory (RAM), a processor, a host interface, a memory interface, and an error corrector circuit.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 16:
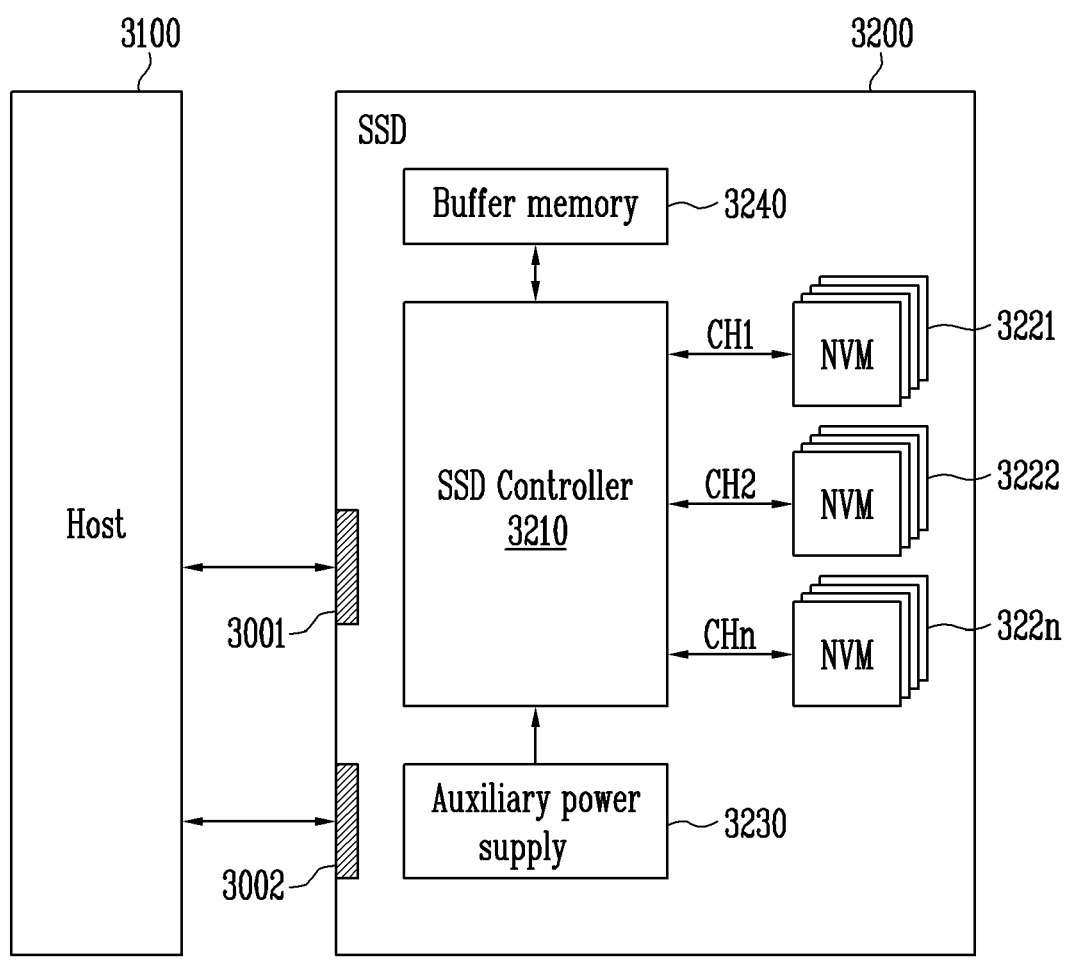
FIG. 16 is a block diagram illustrating a solid state drive (SSD) system to which a storage device is applied according to an embodiment of the present disclosure.

FIG. 16 is a block diagram illustrating a solid state drive (SSD) system to which a storage device is applied according to an embodiment of the present disclosure.

Referring to FIG. 16, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of nonvolatile memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of nonvolatile memories 3221 to 322n in response to the signal received from the host 3100. For example, the signal may be signals based on an interface between the host 3100 and the SSD 3200. For example, the signal may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may be charged with the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of nonvolatile memories 3221 to 322n, or may temporarily store metadata (for example, a mapping table) of the nonvolatile memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

According to an embodiment of the present disclosure, the buffer memory 3240 may perform a function of the buffer memory 300 described with reference to FIG. 1.

Figure 17:
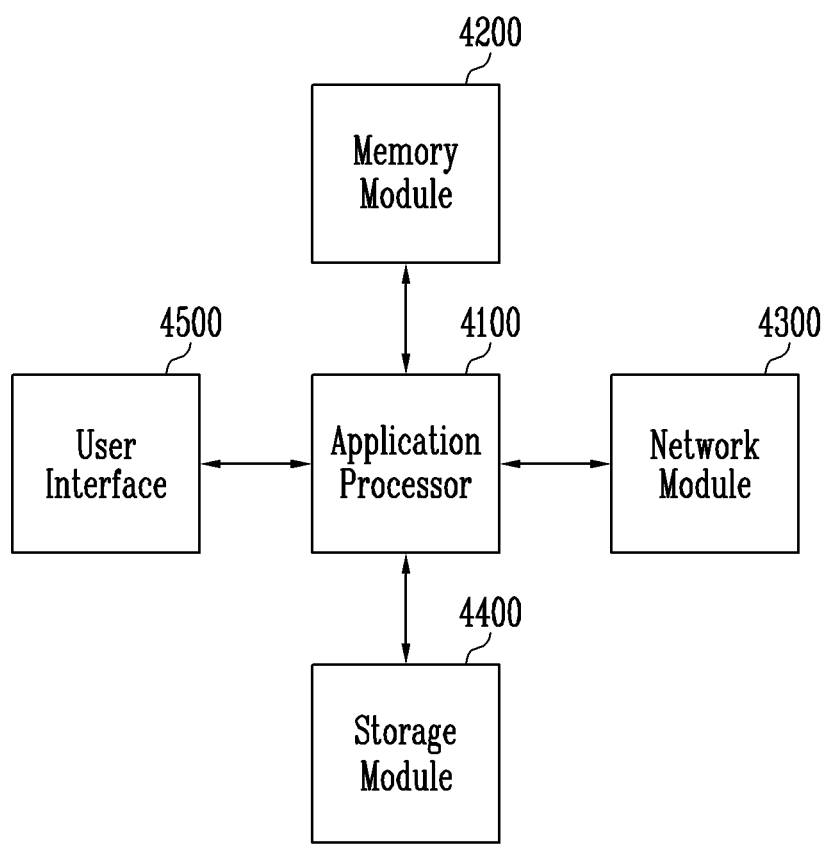
FIG. 17 is a block diagram illustrating a user system to which a storage device is applied according to an embodiment of the present disclosure.

FIG. 17 is a block diagram illustrating a user system to which a storage device is applied according to an embodiment of the present disclosure.

Referring to FIG. 17, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and be provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100, or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A storage device comprising:
   a memory device including a plurality of pages;
   a buffer memory configured to store:
   address mapping information including a mapping relationship between a plurality of logical addresses provided from a host and a plurality of physical addresses corresponding to the plurality of pages,
   first trim bitmap information including trim information of a plurality of first logical address groups each including a first number of logical addresses that are at least two logical addresses of the plurality of logical addresses, and
   second trim bitmap information including trim information of a plurality of second logical address groups each including a second number of logical addresses greater than the first number of logical addresses; and
   a memory controller configured to change, based on a number of trim-requested logical addresses from the host, map states of the trim-requested logical addresses to trim states in one of the address mapping information, the first trim bitmap information, and the second trim bitmap information,
   wherein a map state is a state that a logical address is mapped to a physical address, and
   wherein a trim state is a state that a logical address is unmapped from a physical address.

2. The storage device of claim 1, wherein when the number of trim-requested logical addresses is less than the first number, the memory controller changes mapping information of the trim-requested logical addresses among the plurality of logical addresses to the trim state in the address mapping information.

3. The storage device of claim 1, wherein when the number of trim-requested logical addresses is equal to or greater than the first number and less than the second number, the memory controller changes trim information of a trim-requested first logical address group including the trim-requested logical addresses among the plurality of first logical address groups to the trim state in the first trim bitmap information.

4. The storage device of claim 3, wherein the memory controller changes mapping information of the trim-requested logical addresses among the plurality of logical addresses to the trim state in the address mapping information, based on the changed trim information of the trim-requested first logical address group in the first trim bitmap information.

5. The storage device of claim 4, wherein after the memory controller changes the mapping information of the trim-requested logical addresses to the trim state in the address mapping information, the memory controller changes the trim information of the trim-requested first logical address group to the map state in the first trim bitmap information.

6. The storage device of claim 1, wherein when the number of trim-requested logical addresses is equal to or greater than the second number, the memory controller changes trim information of a trim-requested second logical address group including the trim-requested logical addresses among the plurality of second logical address groups to the trim state in the second trim bitmap information.

7. The storage device of claim 6, wherein the memory controller changes trim information of trim-requested first logical address groups each including some of the trim-requested logical addresses among the plurality of first logical address groups to the trim state in the first trim bitmap information, based on the changed trim information of the trim-requested second logical address group in the second trim bitmap information.

8. The storage device of claim 7, wherein the memory controller changes mapping information of the trim-requested logical addresses among the plurality of logical addresses to the trim state in the address mapping information, based on the changed trim information of the trim-requested first logical address groups in the first trim bitmap information.

9. The storage device of claim 8,
   wherein after the memory controller changes the trim information of the trim-requested first logical address groups to the trim state in the first trim bitmap information, the memory controller changes the trim information of the trim-requested second logical address group to the map state in the second trim bitmap information, and
   wherein after the memory controller changes the mapping information of the trim-requested logical address to the trim state in the address mapping information, the memory controller changes the trim information of the trim-requested first logical address groups to the map state in the first trim bitmap information.

10. The storage device of claim 1, wherein after the memory controller changes the map states of the trim-requested logical addresses in one of the address mapping information, the first trim bitmap information, or the second trim bitmap information, the memory controller provides the host with a response signal for a trim request corresponding to the trim-requested logical addresses.

11. The storage device of claim 10, wherein if the memory controller changes the map states of the trim-requested logical addresses in one of the first trim bitmap information and the second trim bitmap information, after the memory controller provides the response signal to the host, the memory controller changes the mapping information of the trim-requested logical addresses to the trim state in the address mapping information based on the changed states of the trim-requested logical addresses in the first trim bitmap information or the second trim bitmap information.

12. The storage device of claim 1, wherein each of the plurality of second logical address groups corresponds to at least two or more first logical address groups among the plurality of first logical address groups.

13. The storage device of claim 12, wherein the memory controller controls the memory device to store the trim information of one of the plurality of second logical address groups and the trim information of the first logical address groups corresponding to the one second logical address group in the same memory area in the memory device.

14. A method of operating a storage device including a memory device including a plurality of pages, a buffer memory, and a memory controller that controls the memory device and the buffer memory, the method comprising:
   generating address mapping information including a mapping relationship between a plurality of logical addresses provided from a host and a plurality of physical addresses corresponding to the plurality of pages;
   generating first trim bitmap information including trim information of a plurality of first logical address groups each including a first number of logical addresses that are at least two logical addresses of the plurality of logical addresses;
   generating second trim bitmap information including trim information of a plurality of second logical address groups each including a second number of logical addresses greater than the first number of the plurality of logical addresses;
   receiving a trim request from the host;
   changing trim information of a trim-requested second logical address group including trim-requested logical addresses from the host among the plurality of second logical address groups to a trim state in the second trim bitmap information;
   changing trim information of trim-requested first logical address groups each including some of the trim-requested logical addresses among the plurality of first logical address groups to the trim state in the first trim bitmap information, based on the changed trim information of the trim-requested second logical address group in the second trim bitmap information; and
   changing mapping information of the trim-requested logical addresses among the plurality of logical addresses to the trim state in the address mapping information, based on the changed trim information of the trim-requested first logical address groups in the first trim bitmap information,
   wherein the trim state is a state that a logical address is unmapped from a physical address.

15. The method of claim 14, further comprising:
   changing the trim information of the trim-requested second logical address group to a map state in the second trim bitmap information after changing the trim information of the trim-requested first logical address groups to the trim state; and
   changing the trim information of the trim-requested first logical address groups to the map state in the first trim bitmap information after changing the mapping information of the trim-requested logical address to the trim state in the address mapping information,
   wherein the map state is a state that a logical address is mapped to a physical address.

16. The method of claim 14, further comprising providing the host with a response signal for the trim request corresponding to the trim-requested logical addresses after changing the trim information of the trim-requested second logical address group to the trim state in the second trim bitmap information.

17. The method of claim 14, wherein each of the plurality of second logical address groups correspond to at least two or more first logical address groups among the plurality of first logical address groups.

18. The method of claim 17, further comprising storing the trim information of one of the plurality of second logical address groups and the trim information of the first logical address groups corresponding to the one second logical address group in the same memory area in the memory device.

19. A storage device comprising:
   a buffer memory configured to buffer:
   entry values each representing a state that a logical address is unmapped from or mapped to a physical address,
   first bit values each representing the states of a first number of ones among the logical addresses, and
   second bit values each representing the states of a second number of ones among the logical addresses, the second number being greater than the first number; and
   a controller configured to:
   change one or more among the first bit values to reflect the change of the first bit values into the entry values in response to an unmap request for target logical addresses, a number of which is between the first and second numbers, and
   change one or more among the second bit values to reflect the change of the second bit values into the entry values in response to the unmap request for the target logical addresses, a number of which is greater than the second number,
   wherein the controller is further configured to output a response for the unmap request upon changing the first or second bit values.

20. The storage device of claim 19, wherein the controller is further configured to change entry values corresponding the target logical addresses to an unmap state, based on the change of the first bit values or the change of the second bit values.

* * * * *